July 14, 1925.

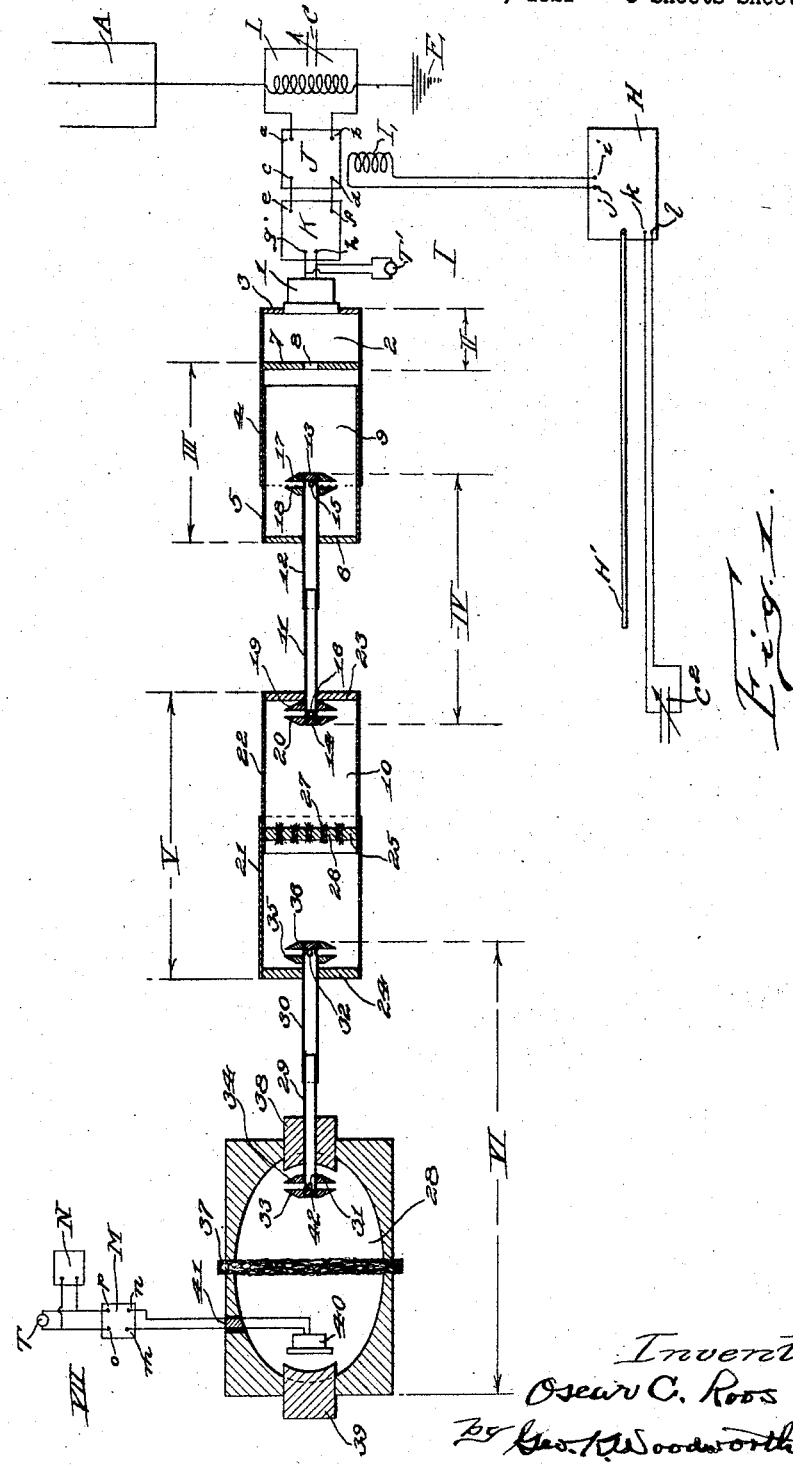

O. C. ROOS 1,545,697

ELECTROMAGNETIC WAVE RECEIVING SYSTEM

Original Filed Nov. 4, 1921    9 Sheets-Sheet 2

Inventor:
Oscar C. Roos
by Geo. K. Woodworth
Atty.

July 14, 1925.                                                     1,545,697
                            O. C. ROOS
                ELECTROMAGNETIC WAVE RECEIVING SYSTEM
            Original Filed Nov. 4, 1921      9 Sheets-Sheet 4

Inventor:
Oscar C. Roos
By Geo. W. Woodworth
Atty.

July 14, 1925.
O. C. ROOS
1,545,697
ELECTROMAGNETIC WAVE RECEIVING SYSTEM
Original Filed Nov. 4, 1921  9 Sheets-Sheet 5
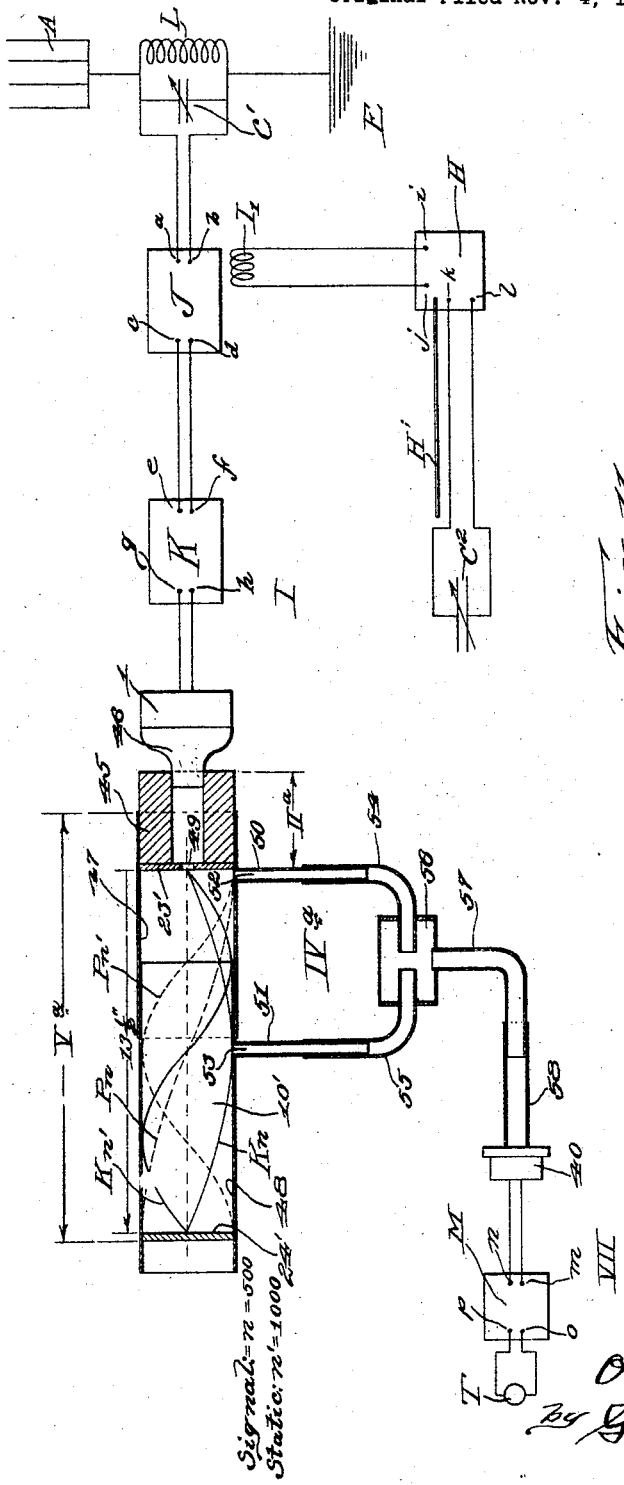
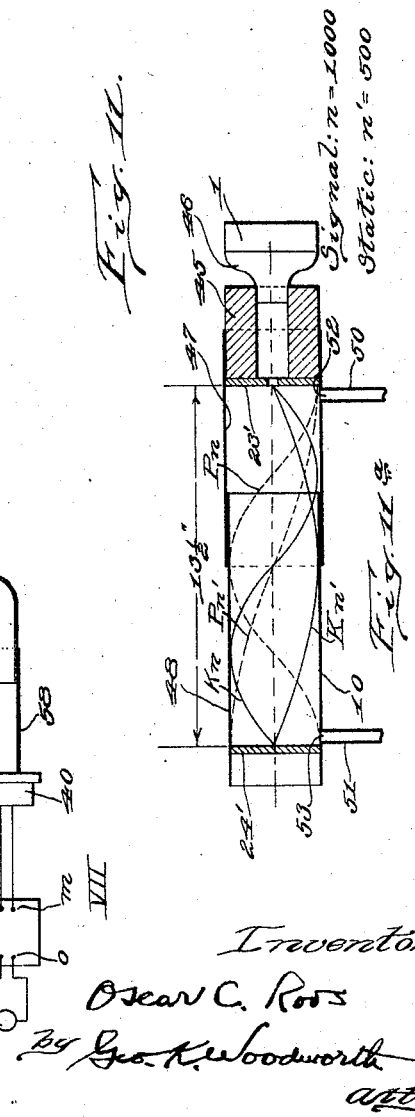
Inventor:
Oscar C. Roos
by Geo. K. Woodworth
Atty.

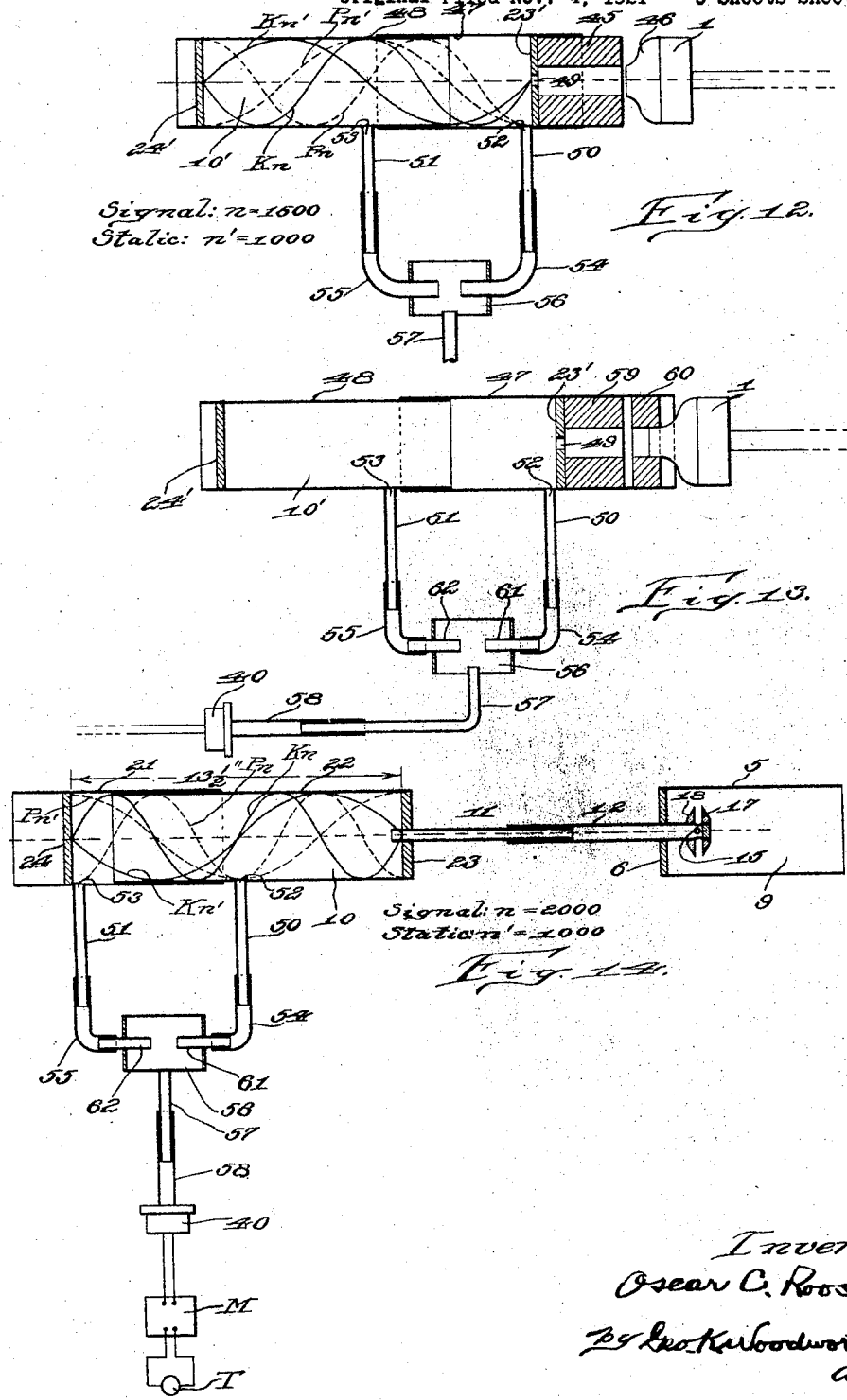

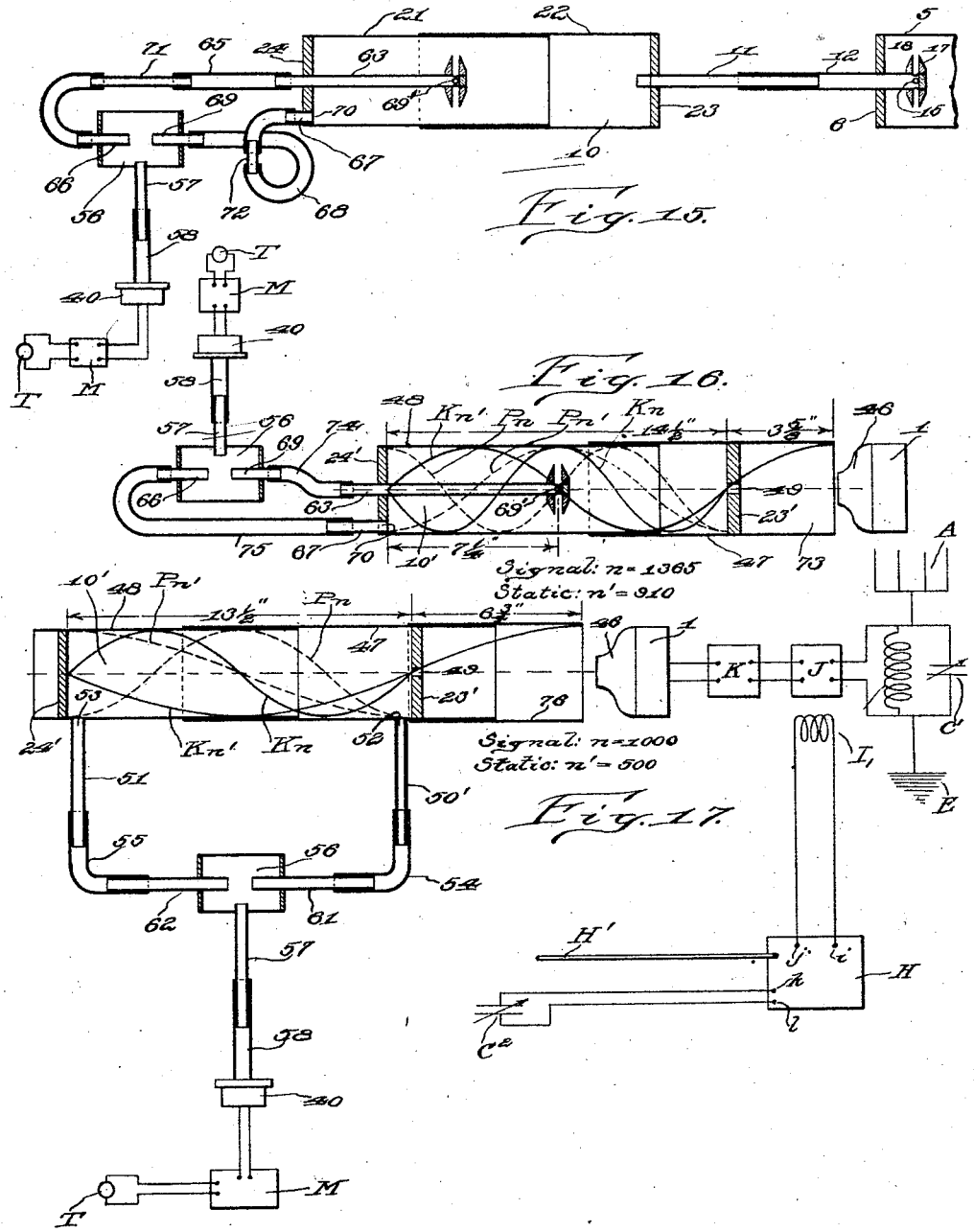

July 14, 1925.

O. C. ROOS 1,545,697

ELECTROMAGNETIC WAVE RECEIVING SYSTEM

Original Filed Nov. 4, 1921    9 Sheets-Sheet 8

Inventor:
Oscar C. Roos
By Geo. K. Woodworth
Atty.

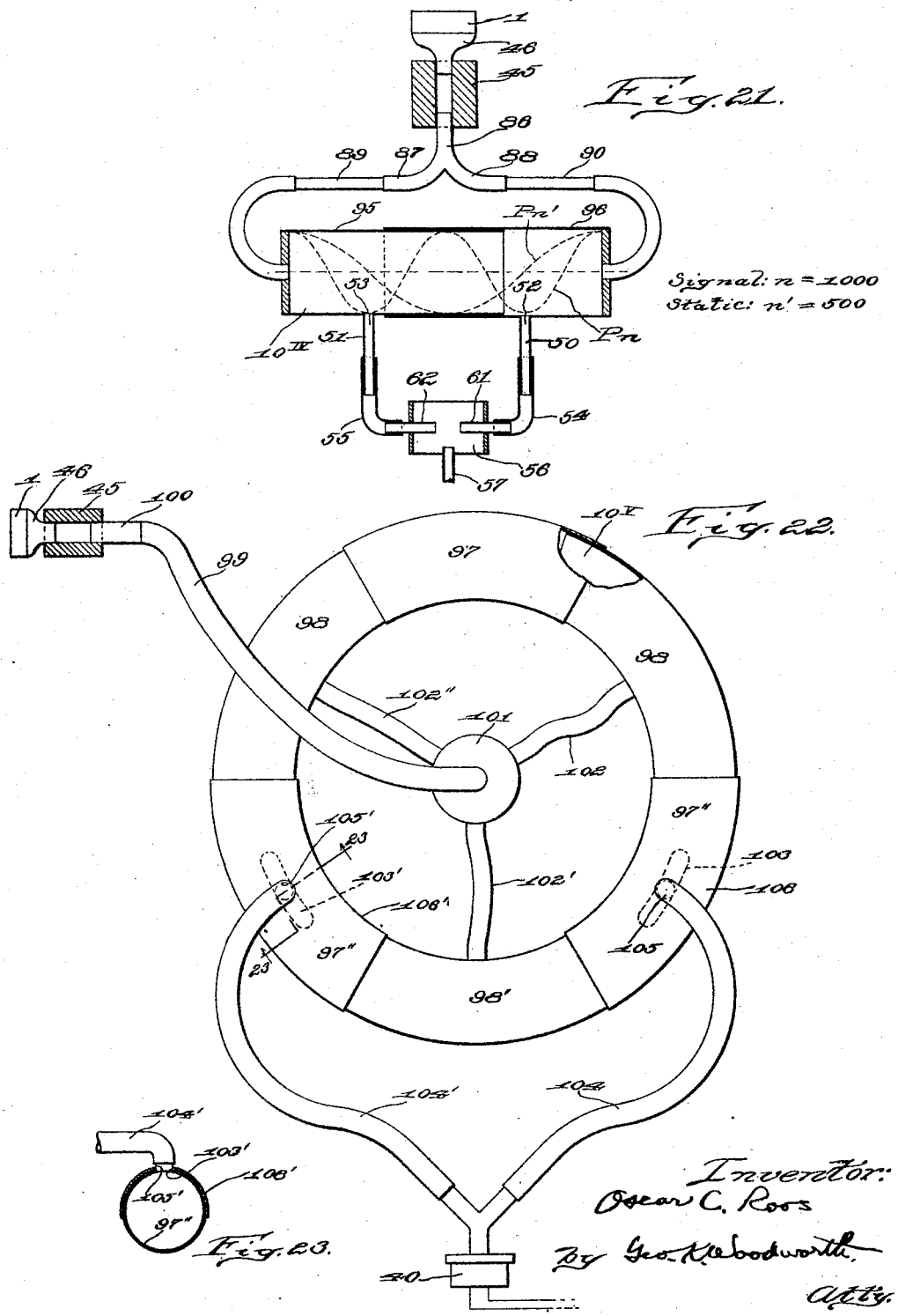

Patented July 14, 1925.

1,545,697

UNITED STATES PATENT OFFICE.

OSCAR C. ROOS, OF BOSTON, MASSACHUSETTS.

ELECTROMAGNETIC-WAVE-RECEIVING SYSTEM.

Application filed November 4, 1921. Serial No. 512,785.

*To all whom it may concern:*

Be it known that I, OSCAR C. ROOS, a citizen of the United States, and a resident of Boston, in the county of Suffolk and State of Massachusetts, have invented a new and useful Improvement in Electromagnetic-Wave-Receiving Systems, of which the following is a specification.

My invention relates to electromagnetic-wave receiving-systems and more especially to such systems whereby the effect on the signal-indicating device of electrical vibrations created in the system by abrupt or impulsive electrical forces, such for example, as "static disturbances," so called, or electrical vibrations created in the system by interfering signal waves, is eliminated or reduced to a minimum so that the signal-interference ratio is a maximum.

My invention is based on my discovery that the irregular non-musical noises or non-harmonic vibrations produced by a signal-indicating device such as a telephone receiver when the receiving system is acted upon by abrupt or impulsive electrical forces may be converted into spatialized periodic vibrations.

In carrying out my invention I provide means for converting the electrical vibrations developed in the receiving system by abrupt or impulsive electrical forces and the electrical vibrations developed therein by the electromagnetic waves the energy of which is to be received into dephased spatialized non-electrical vibrations, such for example as sonorous vibrations produced in an air column, an apparatus so associated with said means that the amplitude therein of the non-electrical vibrations resulting from the waves the energy of which is to be received is large compared to the amplitude therein of the non-electrical vibrations resulting from the abrupt or impulsive electrical forces, and a signal-indicating device associated with said apparatus. The non-electrical vibrations which pass into said apparatus may be converted into electrical vibrations by any suitable means, and in such case a signal-indicating device is operatively connected with said means.

My invention comprises means for converting the irregular complex noises produced by a signal-indicating device, such as a telephone receiver, when the receiving system is acted upon by abrupt or impulsive electrical forces into well defined steady acoustic vibrations of any convenient pitch, such means consisting, for example, of a resonant air chamber so designed that when the confined body of air therein is shocked into vibration at its own period, an acoustic vibration different in pitch from that of the signal will be produced, the pitch of which signal is under complete control of the operator by means of the heterodyne. The complex sound, consisting of the acoustic vibration produced by the signal waves and the non-musical noise produced by the electrical disturbance, which is introduced into the air chamber will produce a resultant complex vibration which is the sum of its components, but which when of audible pitch is different in sound from either.

My invention comprises also a means for spatializing the two sound waves making up the resultant acoustic vibration aforesaid, such means being for example a resonant air-chamber of such dimensions that the two sets of vibrations will produce stationary sound-waves therein which, being of different frequencies, will be dephased. Means are provided for picking up the stationary sound-wave produced by the signal-waves at a point where the amplitude thereof is large compared to the amplitude of the stationary sound-wave formed by the electrical disturbance, for example, at a pressure loop of the former and a pressure node of the latter.

Having separated the two sets of sound waves and picked up a portion of the energy of the stationary sound-wave formed by the signal vibrations, I may use the same for producing the signal or I may employ apparatus such as an electromagnetic telephone transmitter for reconverting such sound waves into electrical vibrations, and transmit the latter to a signal-indicating device. By transmission through several stationary-wave separating devices in succession, further separation of the signal and interference vibrations may be effected.

My invention contemplates the use of a sound reflection or refraction device whereby the sonorous vibrations produced by the signal waves after separation from the sonorous vibrations produced by the electrical disturbances may be concentrated on the apparatus which reconverts them into electrical vibrations.

It will be obvious that the principle underlying my invention may be embodied in a great variety of apparatus and that various circuit arrangements may be employed in connection therewith for converting the energy of electromagnetic waves into sonorous vibrations at one end of my apparatus and for converting sonorous vibrations into readable signals at the other; and therefore it will be understood that the several embodiments of my invention hereinafter particularly described are illustrative merely and not restrictive.

In the drawings which accompany and form a part of this specification—

Figure 1 is a diagram of an electromagnetic wave receiving-system embodying my invention, certain parts being shown in longitudinal vertical section;

Fig. 11 is a diagram of an electromagnetic-wave receiving-system embodying my invention wherein a counter-phase tube is employed for conveying the energy of the signal vibrations to the signal indicating device, certain parts being shown in longitudinal vertical section;

Figure 18:
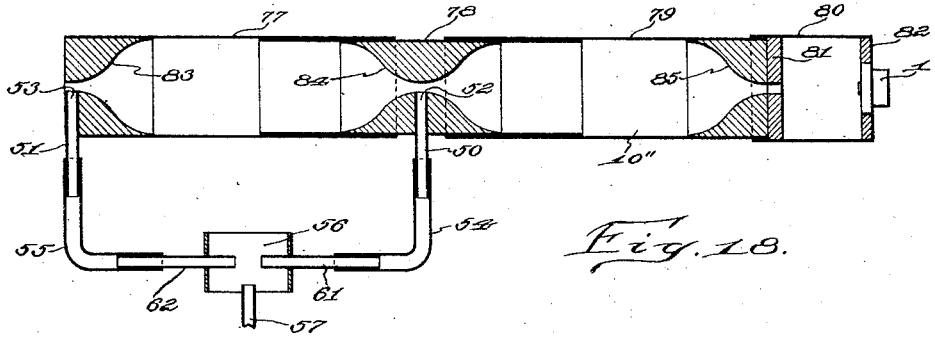
Figure 19:
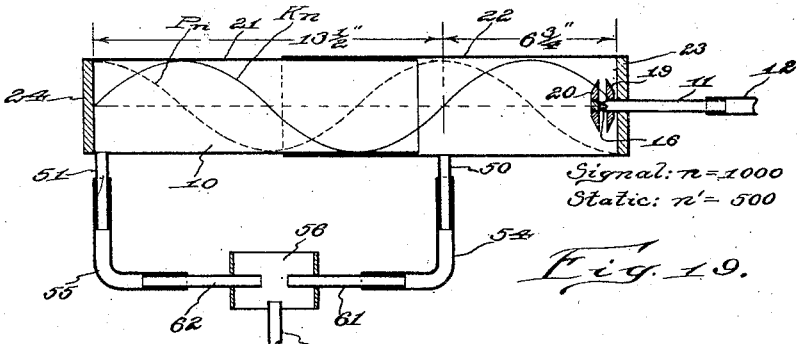
Figure 20:
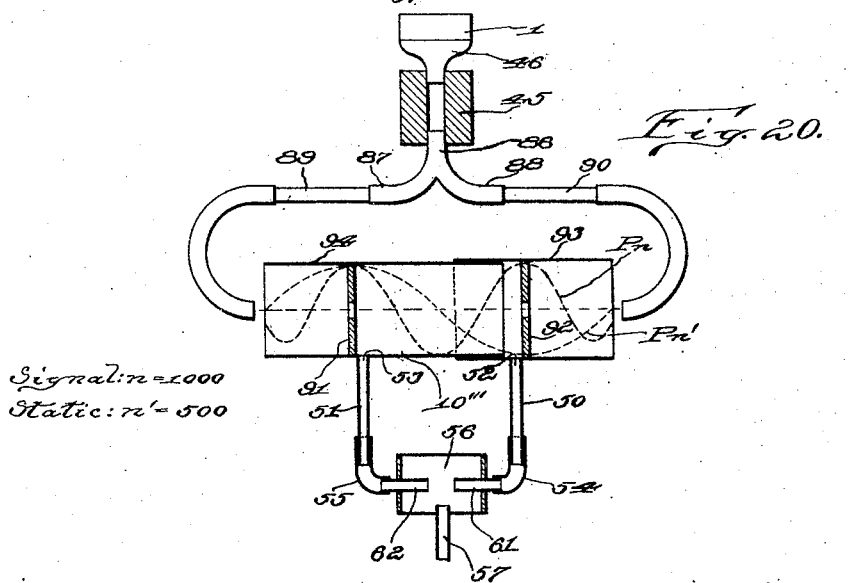

Fig. 11$^a$ is a longitudinal vertical section of a modification of the apparatus shown in Fig. 11 wherein the ratio of the signal vibrations to the shock-excited vibrations is 2 to 1;

Fig. 12 is a longitudinal vertical section of another modification of the system shown in Fig. 11 wherein the ratio of the signal vibrations to the shock-excited vibrations is 3 to 2;

Fig. 13 is a longitudinal vertical section of a further modification of the system shown in Fig. 11 wherein the percussion chamber consists of two relatively movable tubes;

Fig. 14 is a longitudinal vertical section illustrating the application of the counter-phase tube to the system shown in Fig. 1;

Fig. 15 is a longitudinal vertical section showing a further modification of the apparatus represented in Fig. 14;

Fig. 16 is a vertical longitudinal section showing a further modification of the system illustrated in Fig. 11;

Fig. 17 is a diagram of an electromagnetic-wave receiving-system illustrating another modification of the system shown in Fig. 11, wherein a combined percussion and reverberation chamber is employed, certain parts being shown in vertical longitudinal section;

Fig. 18 is a vertical longitudinal section illustrating an apparatus for accentuating the maximum concentration of the potential energy of the acoustic stationary waves in the spatializing tube;

Fig. 19 is a vertical longitudinal section illustrating a modification of the system shown in Fig. 1 wherein the shock-excited vibrations are prevented from forming stationary waves of sensible amplitude in the chamber in which the acoustic signal waves are spatialized;

Fig. 20 is a vertical longitudinal section of another modification in which an open spatializing tube, excited at both ends by both sets of vibrations, is employed;

Fig. 21 is a vertical longitudinal section of a further modification in which a closed spatializing tube is excited at both ends by both sets of vibrations;

Fig. 22 is a plan view partly in section, of an apparatus embodying my invention wherein a toroidal tube is employed as an acoustic spatializer;

Fig. 23 is a vertical section taken on the line 23—23 of Fig. 22.

In the particular drawings selected for more fully disclosing the principle underlying my invention A represents an antenna connected to earth at E through the inductance L shunted by the condenser C whereby the system is attuned to the frequency of the waves the energy of which is to be received. Connected with the receiving antenna is a radio-frequency amplifier J, the in-put terminals $a$, $b$, thereof, being connected across the terminals of the inductance L or operatively associated with the antenna in any suitable manner, and the out-put terminals $c$, $d$, of said radio-frequency amplifier are connected to the in-put terminals $e$, $f$ of an audio-frequency amplifier K which includes an oscillation detector. The out-put terminals $g$, $h$ of the audio-frequency amplifier are connected to an electro-translating device 1 for converting the electrical vibrations developed in the receiving system by abrupt or impulsive electrical forces and the electrical vibrations developed therein by the waves the energy of which is to be received, as well as the vibrations created in the system by interfering signal waves, into non-electrical vibrations.

In the present instance the translating device 1 is shown as a loud speaking telephone receiver by which the electrical vibrations aforesaid are converted into sonorous vibrations.

Figure 2:
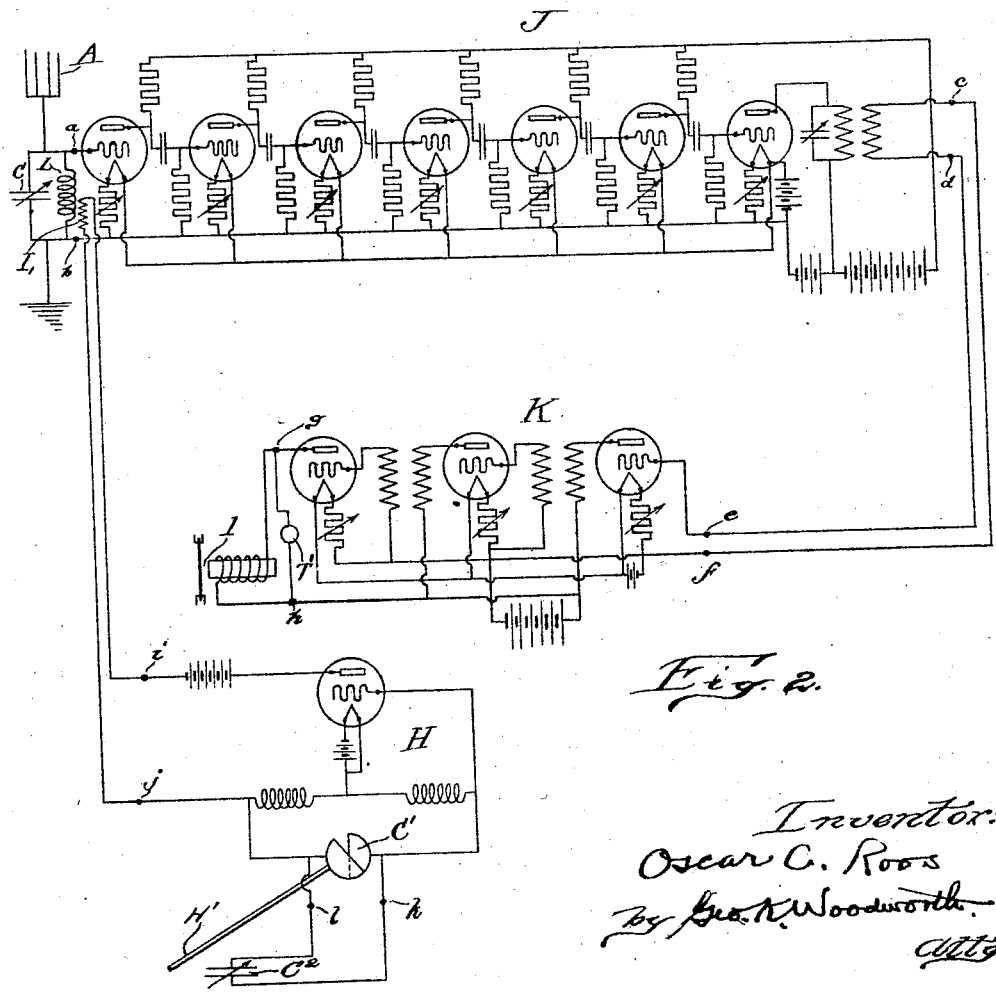
Fig. 2 is a diagram illustrating an arrangement of circuits which may be employed in connection with my invention for converting electrical impulses into sound waves.

It will be understood, of course, that any suitable radio-frequency amplifier and audio-frequency amplifier may be employed for the purposes above indicated and that I do not limit myself to the well-known types of such apparatus represented diagrammatically in Fig. 2 for completeness of disclosure.

Any suitable transmitting system can be employed in conjunction with my improved receiving system, provided that when a telephone receiver is employed as said translating device 1, said transmitting system will cause said receiver to produce audible tones. Suitable transmitting systems are shown in my Letters Patent Nos. 1,278,507 and 1,278,508, dated September 10, 1918.

Preferably a heterodyne is associated with the receiving system, and in Fig. 2 I have shown in diagram and in Fig. 1 have indicated, a heterodyne oscillator inductively related to the inductance L by the primary $I_1$, said heterodyne having the usual condenser C' adjusted by the handle H' and the adjustable condenser $C^2$. The translating device 1 is operatively associated with the percussion chamber 2, being fitted into an aperture in the end wall 3 of the tube 4, in the present instance. Slidably arranged within the tube 4 is a tube 5 having an end wall 6, whereby the length of the column of air between the end wall 6 and the partition 7, adjustably arranged within the tube 4 and having a central orifice 8, may be varied.

The telescoping tubes may be of metal and the end walls 3 and 6 thereof, as well as the partition 7, are preferably wooden discs closely fitting the same by a light cloth wrapping such as felt.

The chamber 9 between the discs 6 and 7 constitutes a reverberation chamber, and in the present instance the tubular wall of the percussion chamber 2 is integral with the tube 4, although it will be understood, of course, that said percussion chamber may be entirely separate from the chamber 9. Coupling the reverberation chamber with the stationary wave-separating chamber 10 is a member shown in the present instance as consisting of two telescoping tubes 11, 12 which are preferably of metal of at least one thirty second inch in thickness, and having a much smaller diameter than the chambers 9 and 10.

Each tube is closed at its outer end by a plug 13, 14, respectively, which may be of wood, and is provided near its outer end with several radial holes 15, 16, each having a diameter equal to about one half that of the tube.

Each tube is provided with two pick-up discs 17, 18 and 19, 20, respectively, placed as shown on either side of the radial holes 15, 16, said discs preferably being of wood and arranged for longitudinal movement along the tube so as to vary the effective opening of said holes and the distance between each pair of discs.

The stationary-wave-separating chamber 10 consists of two telescoping tubes 21, 22, each preferably of metal and having end walls 23, 24, respectively, which are preferably wooden discs.

Midway between the end walls of the chamber 10 there may be placed a partition 25 preferably of wood and provided with a number of apertures 26 filled with tufts of hair, felt or other sound absorbing porous material 27.

Coupling the stationary-wave-separating chamber with the reflection-absorption chamber 28 is a pair of telescoping tubes 29, 30 similar in all respects to the tubes 11, 12, respectively, said tubes being provided with a series of radial apertures 31, 32 and pick-up discs 33, 34 and 35, 36.

The reflection-absorption chamber 28 consists of two sections preferably of wood, the inner surfaces of which are ellipsoids or paraboloids of revolution, which may be slightly separated and a sheet of felt 37 or the like, or a diaphragm similar to the diaphragm 25, placed therebetween. Each section of the chamber 28 is provided with a plug 38, 39, adjustable longitudinally of the major axis of said chamber, the juxtaposed surfaces of which preferably are identical with those of the sections of the chamber in which they are placed.

Suspended from the top wall of the chamber 28 in any suitable manner is a translating device capable of converting sound waves into electrical vibrations, such device being placed with its driven member at a focus of said chamber. In the present instance the translating device is shown as an electromagnetic-telephone transmitter 40 suspended by wires passing through the plug 41 which fits into an aperture in the top of the chamber.

The transmitter 40 is connected to the input terminals $m$, $n$ of the audio-frequency amplifier M, and the out-put terminals $o$, $p$, thereof are connected to a signal indicating device T, across the terminals of which may be connected an audibility meter N.

Figure 3:
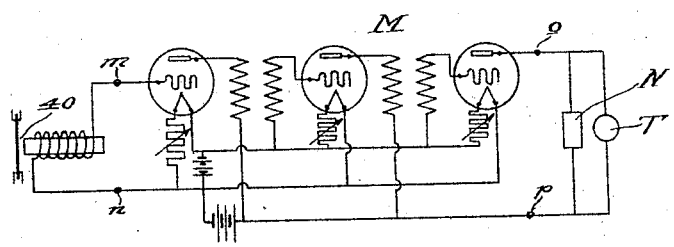
Fig. 3 is a diagram representing an arrangement of circuits which may be employed in connection with my invention for reconverting the sound waves into electrical vibrations and the latter into readable signals.

It will be understood of course, that the details of the audi-frequency amplifier M which I have shown in Fig. 3 are for purposes of illustration only, and that I do not limit myself to the use thereof.

The foregoing is a brief description of one of the precise arrangements of apparatus and circuits wherein I have embodied my invention in practice. A detailed description of the same giving the sizes and proportions of parts which were found to give good results, as well as the mode of operation thereof, and the theory underlying the same, will now be set forth.

The arrangement of apparatus and circuits shown in Fig. 1 constitutes a complete acoustic filter consisting of seven elements starting with the generator of acoustic vibrations and ending with the signal indicating device for using the acoustic vibrations making up the signal to be received when filtered clear of undesired acoustic vibrations created by electrical disturbances or by interfering signals, as follows:

I, the electromagnetic-wave receiving-system comprising the loud-speaking telephone 1 or other generator of acoustic vibrations; II, the filter-coupling device or percussion chamber 2; III, the reverberating device or echo chamber 9; IV, the resonant filter-coupling device 11, 12; V, the stationary-wave separating-device or stationary-wave chamber 10; VI, the filter-coupling device comprising the tubes 29, 30 and the reflection-absorption chamber 28; VII, the indicating or recording apparatus comprising the translating device 40, the reamplifier M, if employed, and the signal indicating device T.

As above stated the element I may consist of any suitable electromagnetic-wave receiving-system provided with a loud-speaking telephone such for example, as the "magnavox" reproducer, which I have found to be well suited for my purpose.

The element II or percussion chamber, consists of a sound chamber in the form of a cylinder the length of which is small compared to the wave length of the acoustic vibrations passing through the apparatus. The velocity of sound in air being about 13,500″ per second, it follows that a sound wave having a frequency of 1000 cycles per second will be 13.5″ long and therefore when the apparatus is designed so that abrupt or impulsive electrical forces will produce acoustic vibrations of said frequency in the reverberation chamber, the distance between the two walls 3, 7, of the percussion chamber should be small compared to 13.5″. In general, it should never be longer than a quarter wave length of the vibrations having the lowest frequency which pass through the system.

The element III or reverberating device consisting as aforesaid of the telescoping tubes 4, 5 is about three inches in internal diameter and has a hole not smaller than three-eighths inch in the center of its end wall 6, the hole 8 similarly located in the end wall 7 having approximately the same dimension. The telescoping tubes 4, 5 are from seven inches to ten inches in length, the tube 4 which forms part of the percussion chamber being slightly longer than the tube 5 in the present case.

The distance between the end walls 6 and 7 of the reverberating chamber is adjusted so that the enclosed volume of air is resonant to at least two predetermined frequencies which preferably are in the ratio of 1 to 2 or 2 to 3.

The general rule which I have followed in the use of this apparatus is as follows:—

(1) Choose an audio-frequency which is coincident with some interfering beat-tone or spark-tone produced by the loud-speaking telephone, this being the frequency of the vibrations to be eliminated. (2) Tune the reverberating chamber 9, by sliding the tube 5 with respect to the tube 4, to the said audio-frequency. (3) Select a frequency for passage through the complete apparatus whose half wave-length is an integral submultiple of a half wave length of the frequency to be eliminated, for example, if the frequency to be eliminated is 500, the frequency to be transmitted through the apparatus may be 1000, 2000, 3000 cycles, etc. When the reverberating device 9 is a cylinder, it will pass all such frequencies when it is attuned so that its fundamental is equal to 500 cycles.

When abrupt or impulsive electrical forces cause the loud-speaking telephone 1 to produce a non-impulsive acoustic disturbance much of the energy of the resulting complex vibration will be dissipated in the percussion chamber 2, and the energy remaining therein will effect the shock-excitation of the air in the reverberating chamber 9, which will vibrate at its fundamental and all the harmonics thereof. Inasmuch as by far the larger part of the energy of said vibrations so created in the reverberation chamber is contained in the fundamental vibration thereof, the harmonics of said fundamental may be neglected, for whatever energy is embodied in said harmonics excited by acoustically shocking the reverberation chamber may be filtered out by the filter couplings IV and VI, any unconverted energy from said impulses being heard at the out-put end masked by the signal, since they will be of such small amplitude that the signal-interference ratio is very high.

It is of course essential that the frequency of the shock-excited vibrations be different from that of the useful or signal vibrations, and the latter may be selected to correspond to an upper harmonic of the reverberation chamber 9 in the arrangement shown in Fig. 1, or as explained in connection with Fig.

11, they may correspond to the fundamental of said reverberation chamber. In any event the frequency of the signal vibrations, in the case of the apparatus shown in Fig. 1, ought to be sufficiently different from the fundamental and upper harmonics of the reverberation chamber to ensure against the excitation thereof, in an appreciable degree in said chamber, by acoustic shocks.

Figure 4:
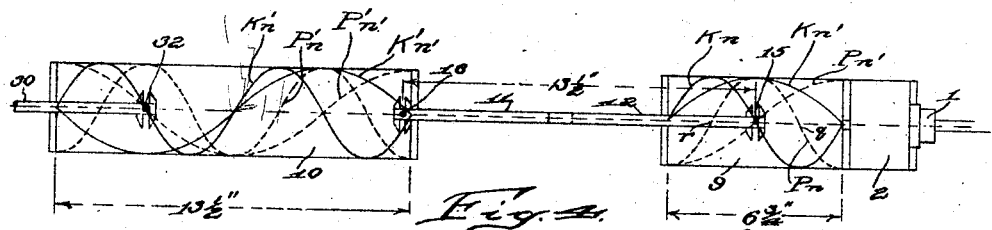
Figs. 4, 5, 6 and 7 are diagrams of dephased spatialized sonorous vibrations hereinafter referred to in explaining the operation of my invention.

Referring to Fig. 4, the reverberation chamber is about 6.75" long and its fundamental therefore is 1000 cycles. The curve Kn' is that of the spatialized acoustic motion constituting the kinetic energy of a stationary wave developed in the reverberation chamber 9 by a non-harmonic acoustic disturbance produced in the percussion chamber 2 by the loud-speaking telephone receiver 1, as for example, by interrupting a circuit including said receiver and a battery about twelve times per second, and the curve Pn' represents the space pressure variation of the potential energy of said wave. Obviously the irregular non-harmonic disturbances produced by the receiver 1 when the receiving antenna A is acted upon by abrupt or impulsive electrical forces will be converted into spatialized periodic vibrations having, in the present instance, a frequency of 1000 cycles per second, and the motion and pressure curves thereof will have approximately the form shown by the curves Kn', Pn', aforesaid.

The pitch of the acoustic signal vibrations produced by said receiver 1 when the antenna A is acted upon by electromagnetic signal waves is under the control of the operator, who, by adjusting the heterodyne H, may, in the present instance, make said pitch equal to 2000 vibrations per second. In Fig. 4 the curves Kn and Pn represent the spatialized motion and pressure curves of said acoustic signal vibrations, and, as the two sets of acoustic waves are of different frequencies, they are, of course, cyclically dephased along the axis of the reverberation chamber.

Any suitable apparatus may be employed in connection with the reverberation chamber to pick up the sound wave produced by the signal vibrations at a point where the amplitude thereof is large compared to that of the sound wave produced by the electrical disturbance. For instance, the pick-up tube 12 may be so positioned with respect to the reverberation chamber that its openings 15 are at a pressure loop or the maximum ordinate of the curve Pn and at a pressure node of the curve Pn' so that the sound heard at the outer end of said tube will consist in large part of the tone produced by the signal vibrations, the energy of the stationary wave Pn' formed by the disturbances being substantially masked by the signal tone. Therefore, if desired, a translating device of any suitable character may be placed at the outer end of said tube 12. I prefer however, as above stated, and as hereinafter more fully explained, to filter out more of the energy of the electrical-disturbance vibrations by transmission through several stationary-wave separating devices in succession, and to reconvert the acoustic signal vibrations into electrical vibrations which are used to actuate the signal indicating device.

Figure 5:
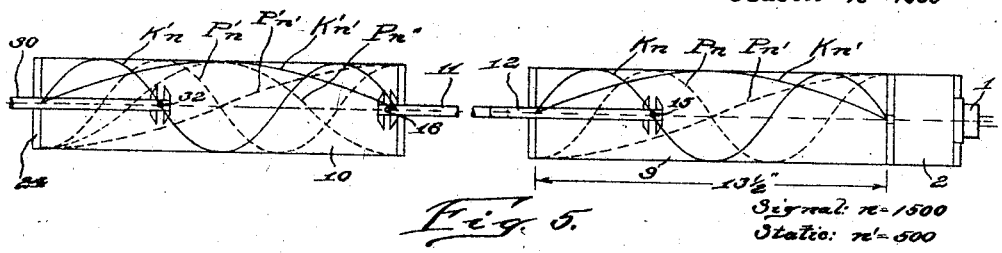

In Fig. 5 where the length of the chamber 9 is shown as 13.5" the fundamental of the reverberation chamber is 500 and corresponds to a half wave length of 13.5". In this case the signal tone may have a frequency of 1500 as indicated by the curves Pn and Kn.

The tube 12 is placed so that its openings 15 are at a maximum of the curve Pn, at which point the ordinate of the curve Pn', while not zero, is considerably less than that of the curve Pn. In such case, the signal-interference ratio may be made as high as desired by successive transmissions of the two sets of waves through stationary-wave separating devices.

Figure 6:
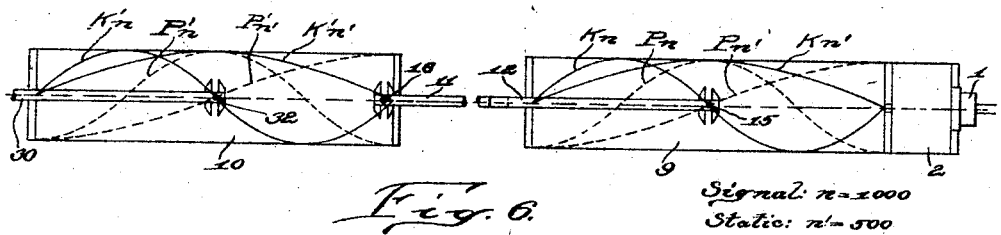

In Fig. 6 the fundamental of the reverberation chamber is taken as before as 500, and the frequency of the signal vibrations is selected as the octave thereof. The openings 15 of the tube 12, may, in this instance, be located at a pressure loop of the signal vibrations and a pressure node of the vibrations created by the disturbances.

It will be understood of course that the values and dimensions given above are merely examples of various ways in which my apparatus may be constructed and used.

The element IV or resonant filter coupling consisting of the two telescoping tubes 11, 12 which may be from one quarter inch to one half inch internal diameter, approximately, is attuned to offer no impedance to the passage of sound waves having the pitch of the signal vibrations and to oppose the passage of sound waves of other frequencies, such as the sound waves created in the reverberation chamber by the electrical disturbances. The openings 15, 16 near the ends of the tubes are, in the present instance, not less than one-eighth inch, nor more than one quarter inch, in diameter and preferably four such openings are placed at a distance from the end of each tube less than the diameter thereof. The diameter of the pick-up discs 17, 18 and 19, 20, as well as those placed at or near the ends of the tubes 29, 30, preferably are approximately fifty five per cent of the diameter of the reverberation chamber 9 of the stationary-wave separating chamber 10. The separation of each pair of discs may vary from one quarter to the total diameter of the holes 15, 16, 31, 32. The closer this separation the sharper the power of the acoustic filter coupling to discriminate between the desired and undesired stationary waves. The smallest advisable separation is one-sixteenth inch. The openings 15, 16 act as acoustic couplings between the vibrations set up in the air column in the reverberation chamber 9 and those set up in the air column of the stationary-wave separating chamber 10. When the opening 15 is at a cross section of the chamber 9 where there is little motion of the air particles and large pressure variation, it transmits such pressure through the tubes 11, 12. This would occur, as shown in Fig. 4, at or near the ends of the chamber 9 under all conditions and at a distance from either end equal to an integral multiple of a half wave length of any acoustic stationary wave formed therein by the periodic vibrations to be received.

In the present instance the filter coupling 11, 12 is attuned to 2000 cycles and therefore its length is approximately 13.5″ between the planes passing through the centers of the two series of holes 15, 16.

It will be evident that the shorter the half wave length between the points $q$, $r$ in Fig. 4 where the pressure stationary-wave curve $Pn$ crosses the zero axis, the smaller will be the displacement of the pick-up holes 15 from the maximum ordinate of said curve, where maximum action in the tubes 11, 12 is obtained, to the said points $q$, $r$, where minimum action is produced,—in other words, the stationary-wave tuning is sharper in terms of bodily displacement of the coupling device 11, 12 along the axis of the reverberation chamber. It is also made sharper by reducing the separation of the pick-up discs 17, 18 at the expense of the energy transmitted into the filter coupling. By virtue of this fact, broad tuning by the pick-up discs is made possible as will hereinafter be explained when forced acoustic vibrations which are not constant in frequency are developed in the reverberation chamber.

A resonant filter-coupling device such as the tubes 11, 12 is not absolutely essential, but I prefer to use the same in order to transmit the largest possible amount of the energy of the vibrations of the desired frequency to the succeeding element of the system, the stationary-wave separating device 10.

The element V or the stationary-wave separating-chamber has substantially the same construction as the echo chamber 9, and must be as long at least as a half wave length in air of the vibrations of the lowest frequency used. Its length is adjusted as hereinafter more fully set forth until a maximum of sound for both the desired and undesired frequencies is detected at the opening through which the tube 30 passes, by a stethoscope or other listening device.

In this connection it must be remembered that a closed tube, shock-excited at one end like the echo chamber 9, will vibrate at its fundamental and all the harmonics thereof, and also that such a tube will resonate to persistent trains of waves or vibrations having the frequency of its fundamental and the frequencies of all the harmonics thereof.

Hence the stationary-wave separating-device will resonate to vibrations of several frequencies simultaneously present therein, as shown in Fig. 5 where the curve $P'n'$ represents the space-pressure variation of a sound wave whose half wave length is 13.5″ and whose frequency therefore is 500, which is the fundamental of said device, the curve $Pn''$ represents the space-pressure variation of a vibration having a half wave length of 6.75″ and whose frequency therefore is 1000, which is the octave or first even harmonic of said device, and the curve $P'n$ represents the space-pressure variation of a vibration having a half wave length of 4.5″ and whose frequency is therefore 1500, this being the first odd harmonic of said device.

Inspection of Fig. 5 will show that at or near the end wall 24 of the wave-separating chamber 10, there will be a maximum of air pressure for every frequency to which the chamber is resonant, and also that at cross sections of said chamber which are distant one third, one half or two thirds of the length of said chamber from either end thereof, there is a region where any detecting apparatus sensitive to air vibrations will give a maximum response for the above mentioned frequencies, respectively.

Preferably a partition is placed at a point midway between the ends of the chamber 10 for the purpose of reducing the amplitude of the fundamental vibration developed therein by the electrical disturbances which are to be eliminated. One of the various forms of partition which may be used for this purpose is shown at 25 in Fig. 1 and consists of a disc of wood about one quarter inch thick provided with a plurality of holes 26 each having a diameter equal approximately to five per cent of the diameter of the partition and the combined area of which is equal to about fifty per cent of the area of said partition, said holes being filled with porous sound-absorbing material. It will be obvious that various other forms of partition such for example as that shown at 37, viz, a sheet of felt or the like, may be employed in the chamber 10.

Referring to Fig. 5, for example, it will be noted that the curve $P'n'$ crosses the zero axis at a point midway between the ends of the tube,—in other words that the fundamental has a pressure node at this point,—and that the octave represented by the curve $Pn''$ has a pressure loop at the same point. If the formation of a node of pressure in the fundamental is prevented by a partition, such as above described, the fundamental will be broken up and practically suppressed because at the point where such fundamental has a node of pressure, it has also a loop of motion as shown by the curve K'n', and such motion is destroyed by the presence of said perforated diaphragm. No appreciable effect, however, is noticed on the stationary pressure wave Pn'' of the octave, because the diaphragm 25 has very small effect where there is very little acoustic motion among the air particles, but considerable pressure variation, there being a motion node (not shown) for the octave at the point where such octave has a pressure loop. In other words, the energy of the octave at this point being practically all potential instead of kinetic, vibrations having a frequency of 1000 will pass the diaphragm while those having a frequency of 500, the energy of which at this point is practically all kinetic, will be practically suppressed.

It will be understood of course that the employment of the said partition is optional. Under certain conditions its use is desirable to help break up the "clang" which is an effect caused by the tendency of sound to persist on account of continued vibration of the air in the various chambers of my apparatus after the incoming signal has ceased to excite the acoustic system. This persistence of vibration under certain circumstances causes the dots and dashes of the telegraphic code to run together so that signals are sometimes difficult to read. This may be diminished by using higher frequencies for the signal tone and by the employment of the diaphragm aforesaid, and by diminishing the volume of air used.

The element VI or the filter coupling device comprising the tubes 29, 30 and the reflection-absorption chamber 28 is employed for still further filtering out the spatialized acoustic vibrations produced by the electrical disturbances. The tubes 29, 30 are substantially the same in construction as the resonant filter-coupling device IV, except that in the present instance the end plug 42 and the pick-up discs 33, 34 may, if desired, be eliminated. The dimensions of the reflection-absorption chamber are such that its major axis is equal approximately to a full wave length of the signal frequency. The opening 31 of the tube 29 is kept at one of the foci of the chamber 28, and the electromagnetic telephone transmitter 40, or other converting device, is maintained so that its diaphragm or driven member is at the other focus. The two halves of the chamber need not be in contact, but may be separated by about one-half inch and in such case it is optional to place a diaphragm of sound absorbing material, such as the felt disc 37 or the perforated wooden disc 25, between them. The function of the reflection-absorption chamber 28 is twofold, viz, (1) It concentrates the acoustic energy at the proper place for use in the converting or translating device 40 which may be an ordinary head-telephone receiver, that is to say, an electromagnetic telephone transmitter (preferably not a microphone transmitter having a battery in series therewith) which for vibrations of 1000 cycles per second will have an impedance of from 20,000 to 30,000 ohms, but obviously various other forms of converting devices, even a microphone transmitter with a battery in its circuit, may be employed.

(2) It establishes a stationary acoustic wave whose pressure loops are made to have a greater degree of sharpness in their effect on the converting device 40 when the acoustic frequency varies, than they exhibit in either the stationary-wave-separating chamber 10 or the echo chamber 9. The plug 39 is used to tune the filter coupling device, VI, by slight longitudinal movement along the major axis of the chamber 28. Usually it will suppress a high pitch signal if moved along said axis not more than one-eighth inch, and a frequency variation of 2.5% will be sufficient to cause the harmonic vibration in the converting device 40 to disappear.

The position of the hole which accommodates the plug 41, above described, is best located first by calculation and then checked empirically, and is arranged so that the diaphragm or driven member of the converter 40 will be approximately at one of the foci of the chamber.

The element VII comprising the converting device 40 and the apparatus associated therewith may consist of any suitable system of circuits and electrical instruments for converting the electrical vibrations developed by the transmitter 40 into readable signals. The signal indicating device may be a head telephone or, where the audibility of the received signal or sounds is sufficiently great and a record thereof is desired, it may be a dictaphone or similar apparatus. Obviously the re-amplifier shown in detail in Figure 3, need not be used. I prefer to secure an amplification of audibility in the re-amplifier of at least 2000 times in order to obtain satisfactory operation if the signal tones produced by the loud-speaking telephone 1 has a strength denoted by at least 500 audibility. It will be understood of course that the audibility meter N, while convenient, is not essential for the accomplishment of the result sought by the present invention.

The operation of the system shown in Fig. 1 is as follows:

The percussion and reverberation chambers are adjusted by relative longitudinal movement of the tubes 4 and 5 and the partition 7 so that an interruption of the current in the transmitter 1 will produce in the reverberation chamber a vibration having the same frequency as the most pronounced interfering audio-frequency of a wireless telegraph transmitting station. The adjustment of said chambers may conveniently be tested among other ways by inserting a flexible ear tube into the reverberation chamber through the opening by which the tube 12 passes into the same. It is to be noted that the length of the air column in the reverberation chamber which would be indicated by theory as the half wave length of a vibration of given frequency is slightly modified by the presence of the percussion chamber so that, for example such air column would not be precisely 6.75" when said chamber is to resonate to a frequency of 2000 or to develop vibrations of a frequency of 1000 when shock-excited. After the filter-coupling 11 and 12 and the stationary-wave-separating chamber 10 are added, the reverberation chamber must be slightly readjusted because of the effect of the added apparatus on the fundamental thereof.

The filter-coupling device 11, 12 is tuned to the fundamental of the reverberation chamber, that is, to the frequency of the vibrations excited in the latter by acoustic shocks, which frequency, as above stated, may be taken as the audio-frequency of the most pronounced interfering signal. The filter-coupling device 11, 12 may conveniently be tuned to the fundamental of the reverberation chamber by listening at the opening 16 of said coupling with an ear tube.

The stationary-wave separating-chamber 10 is now added and adjusted until an ear tube, stethoscope or other suitable device placed at the opening through which the tube 30 enters said chamber, shows that the whole system from the transmitter 1, to and including the stationary-wave separating chamber, is in resonance to the shock tone originally excited in the reverberation chamber, said shock-tone being, of course, the fundamental of said chamber as modified by the associated apparatus, that is to say, the frequency at which said chamber vibrates periodically when abrupt or impulsive electrical forces such as static disturbances act upon the antenna.

By adjustment of the micrometer condenser $C^2$, the tone of the signals to be received by the system is varied until a resonant condition in the chamber 10 is indicated by the same ear tube or other listening apparatus which was used to check the shock-wave resonance therein.

The resonant filter-coupling 11, 12 is again adjusted to give the best resonant value in the chamber 10 for both the shock and signal waves.

The filter-coupling VI is then added and tuned to resonance with the signal tone, using the pick-up discs 33, 34, located as aforesaid at one of the focal points of the reflection-absorption chamber, and having the converting device 40 at the other focal point thereof, although, if desired, a plain open-ended tube may be used in place of the tube 29 the end of which is provided with said pick-up discs 33, 34. The final adjustment of the chamber 28 consists of a slight longitudinal movement of the plug 38 so that the desired signal is heard at a maximum in the signal-indicating device T which may be a head telephone, whereupon the plug 39 is also moved slightly longitudinally until another maximum is heard in the telephone T.

A final observation is made on static audibility, that is to say, the audibility of the vibrations produced when the circuit of the receiver 1 is suddenly interrupted and the reverberation chamber thereby shock-excited, by using the audibility meter N and re-tuning the percussion and stationary-wave separating chambers successively to get the least possible audibility in said meter of the static or shock-excited tone heard in the telephone T.

A signal of less than unit audibility, if measured at the in-put side of the radio-frequency amplifier J, is amplified by the latter to one having an audibility of 300 at least and this again is amplified by the audio-frequency amplifier to a signal having an audibility of more than 3000.

The static disturbances set up in the tuned antenna system by atmospheric electrical charges cause additional sounds in the loud-speaking telephone 1 of an average intensity several times as great as the signals.

These static disturbances, although generally greater in intensity than the signals, can be ignored by a skilled operator if they are not greater than four times the signal strength. They are amplified together with the signal and at the loud-speaking transmitter 1, their ratio to the signal is practically the same as at the in-put terminals of the radio-frequency amplifier J, the audibility of said electrical shocks at the receiver 1 ranging from 3000 to 30,000 as determined by the auxiliary telephone T' or an audibility meter. Under such circumstances it is impossible to read the signals produced by the receiver 1 as they are completely masked by the irregular non-harmonic acoustic disturbances produced by the static disturbances.

The percussion chamber 9 takes up a large part of the acoustic shock from the receiver 1 and determines the shape of the initial impulse-time curve of the acoustic disturbance which it excites in the reverberation or echo chamber 9 whereby the abrupt or impulsive electrical impulses acting upon the antenna system are converted into spatialized sonorous vibrations.

Tracing the static audibility through the chamber 9 and the coupling tubes 11, 12 by inserting a stethoscope at various points therein, it is found that it diminishes together with the signal audibility until, at the in-take of the chamber 10, the signal vibrations and those produced by the static disturbances have about one half the audibility which they had at the outlet 8 of the percussion chamber or the in-take of the echo chamber. At the in-take 32 of the filter-coupling device VI, the ratio of signal to static is reversed so that the signal is at least ten times the static audibility. Moreover, the audibility of the various frequencies present throughout the apparatus, which are due to interfering audio-frequency signals or heterodyne beat-frequencies are reduced to a value not greater than a fraction of the strength of the desired signal when observed at the focal point 31 of the reflection-absorption chamber.

The fabric partition 37 reduces the static audibility to less than ten per cent and in some cases to less than one per cent of the signal, when the acoustic signal wave is the octave of the acoustic static wave, that is, when the audio-frequency of the signal to be received is twice the fundamental of the reverberation chamber.

The tuning plug 39 reduces the strength of the interfering signals, that is, the signals from other stations having audio-frequencies different from that of the signal to be received, to less than twenty per cent of the audibility of the desired signals, and, by making the re-amplifier M resonant to the audio-frequency of the signals to be received, such interfering signals may be reduced to less than five per cent of the audibility of the signals to be received.

Thus it will be seen that by means of the apparatus above described I am able to change a signal-static ratio of 1 to 10, to 10 to 1 and to receive signals which otherwise would be completely masked by static, and I have reduced the audibility of static disturbances from more than 3000 to an average of 50, the range of reduction being between 11 and 300 while at the same time reducing the "clang."

It will be noted that even although the receiving system is not acted upon by abrupt or impulsive electrical forces, my apparatus affords a means for selecting the desired signal from those transmitted by other stations and that this may be accomplished by attuning the reverberation-chamber to the audio-frequency of an interfering signal, modifying the audio-frequency of the signal to be received so that it corresponds to an integral sub-multiple of a half wave length of the interfering signal, spatializing the two sets of stationary waves thereby set up and picking up the energy of the desired signal waves at a point where the amplitude of the same is large compared with the amplitude of the interfering waves. Whether the apparatus is employed to eliminate the effect on the signal indicating device of vibrations created in the system by abrupt or impulsive electrical forces or vibrations created therein by interfering signal waves, the construction and mode of operation of said apparatus is the same.

Where a number of interfering signal waves having different audio-frequencies impinge upon the antenna, some point in the stationary-wave separating-device may be found where the stationary waves set up therein by said interfering signal waves will have a minimum effect on the tube 30 and where the desired waves have a maximum effect thereon, or at least where the ratio of the desired wave to the resultant of the undesired waves is a maximum. This is possible because of the adjustable position of the pick-up discs each pair of which, in such case, will be more widely separated than when employed to discriminate between the stationary-waves produced by static disturbances and those produced by the desired signals.

I have already adverted to the fact that broad tuning is made possible by the aforesaid longitudinal adjustability of the pick-up discs and that this feature is important when the frequency of the signal waves is not constant. It will be obvious that a slight change in the frequency of the transmitting generator and, therefore in the audio-frequency of the signal to be received will shift the maxima of the stationary waves produced in the chamber 10 so that under certain conditions a maximum of such signal wave will be shifted beyond the opening between the pick-up discs 35, 36 if the separation of the latter was made small to increase the sharpness of the tuning. This difficulty can usually be remedied, if the change in the frequency of the transmitted waves is not too great, by increasing the separation of said pick-up discs.

Inasmuch as the acoustic system is very sensitive to noises created in its proximity, it is desirable to employ acoustic shields such as containers lined with felt or other suitable elastic or absorbing material.

It is obvious that my invention is not limited to air as a vibrating medium and that other fluid media may be used in lieu thereof, and also that the various chambers and connecting elements need not have the shapes hereinbefore described.

Referring again to Figs. 4 to 7 on which, without intent to limit my invention thereto, I have placed dimensions and frequency values, it will be apparent that the periodic vibration of frequency $n'$ created in the echo chamber 9 will be transmitted by the coupling-device 11, 12 to the stationary-wave separating-chamber 10, the space-motion curve of such vibration being shown at $K'n'$ and the corresponding space-pressure curve thereof at $P'n'$. In like manner the stationary-wave of frequency $n$ created in the echo chamber by the desired signal will produce in the chamber 10 a stationary sound wave of which $K'n$ is the motion curve, and $P'n$ is the pressure curve. In Fig. 4 the opening 32 of the tube 30 is placed at a zero point of the curve $P'n'$ which is a maximum point of the curve $P'n$, so that the amplitude in said tube of the vibrations resulting from the signal waves is large compared to the amplitude therein of the vibrations resulting from the abrupt or impulsive electrical impulses.

In Fig. 5 the tube 30 is so located that the opening 32 is at a cross section of the chamber 10 where the ordinate of the pressure curve $P'n$ is larger than that of the curve $P'n'$ so that, although the latter is not zero, a much greater effect is produced in the coupling-device VI by the desired waves than by those resulting from the electrical disturbances.

Figure 7:
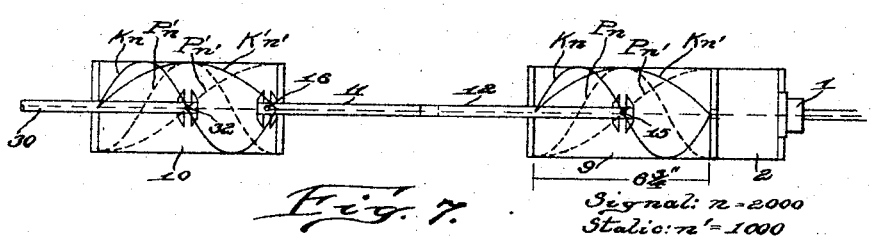

In Fig. 6 the opening 32 of the tube 30 is placed at a point where the stationary wave produced by the static disturbances has a pressure node and that created by the signal vibrations has a pressure loop, this also being the case illustrated in Fig. 7.

It is to be understood that the diagrams shown in Figs. 4 to 7, inclusive, are merely illustrative and that various other ratios of signal frequency to static frequency which may be employed will readily occur to those skilled in the art.

It is also apparent that while I have shown in Fig. 4 a stationary-wave separating-chamber whose first even harmonic is equal to the fundamental of the reverberation chamber and in Figs. 5, 6 and 7, stationary-wave separating chambers whose fundamentals are equal respectively to those of their associated reverberation chambers, various other proportions may be adopted without departing from the principle upon which my invention is founded.

Figure 8:
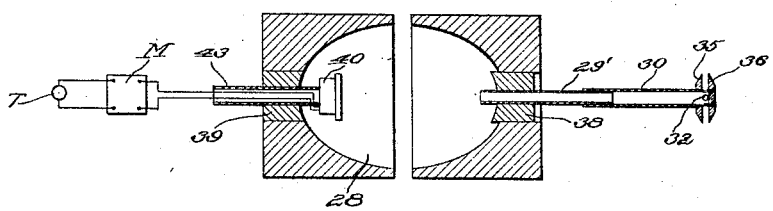
Fig. 8 is a longitudinal vertical section of a modification of the reflection-absorption chamber.

In Fig. 8 the converting device 40 is secured to the end of a tube 43 passing through a hole in the axis of the tuning plug 39, and the leads of said device pass through a hole in said tube and are connected as in Fig. 1 to the in-put terminals of the audio-frequency amplifier M. It is desirable to separate the two halves of the reflection-absorption chamber when even harmonics of the fundamental frequency of said chamber are prominent therein. As indicated the tube 29', passing through the plug 38, may be open-ended, and the pick-up discs omitted.

Figure 9:
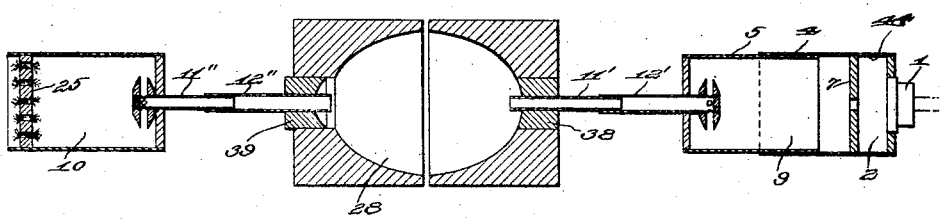
Fig. 9 is a longitudinal vertical section of another modification in which a reflection-absorption chamber is interposed between the reverberation chamber and the stationary-wave-separating chamber.

In Fig. 9 I have shown a modification wherin the reflection-absorption chamber is inserted between the echo chamber 9 and the stationary-wave-separating chamber 10 to still further weaken the vibrations produced by electrical disturbances. In this case, the telescoping tubes 11', 12' connect the chamber 9 with the chamber 28 and the two telescoping tubes 11'', 12'', connect the latter with the chamber 10. In this instance the tube 44 which forms part of the percussion chamber is separate from the tube 4 of the reverberation chamber and is shown as extending half way over the partition 7 which separates said chambers.

Figure 10:
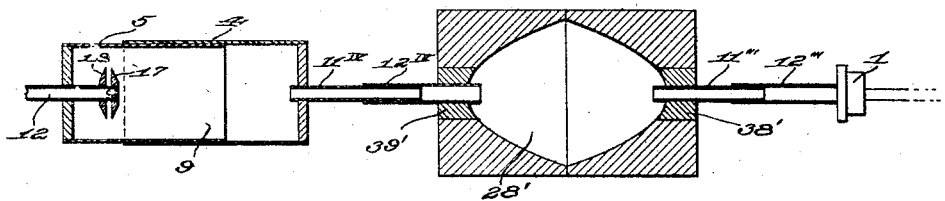
Fig. 10 is a vertical longitudinal section of a further modification in which a reflection-absorption chamber is employed instead of the percussion and reverberation chamber.

The fact that the percussion chamber 2 is substantially a filter-coupling is shown clearly in Fig. 10 wherein the percussion chamber is replaced by the reflection-obsorption chamber 28' illustrated as consisting of two sections, the inner surface of each of which is a paraboloid of revolution, and by the adjustable resonator 11''', 12''' having sound-proof connections between the transmitter 1 and the chamber 28'. In this case the tuning plugs 38', 39' are each given a paraboloid surface corresponding to that of the sections in which they are located. This permits of greater longitudinal separation if desired between the two sections making up the chamber than is generally possible with an ellipsoidal type of chamber such as shown in Figs. 1, 8 and 9. The adjustable resonator 11$^{iv}$, 12$^{iv}$ has sound-proof connections between the chamber 28' and the reverberation chamber 9.

It will be understood without further explanation that the adjustment and mode of operation of the modification shown in Figs. 8, 9 and 10 are the same as above set forth in connection with Fig. 1.

The embodiment of my invention above described is preferred by me for efficiency, but I prefer the embodiment thereof shown in Fig. 11 for simplicity.

In Fig. 11 I have eliminated the reverberation chamber and the reflection-absorption chamber of Fig. 1, and reduced the system to five elements as follows:—

The element I is an electromagnetic-wave receiving-system including the loud-speaking telephone receiver 1, such as already described in connection with Fig. 1.

The element II$^a$ is a percussion chamber consisting in the present instance of a wooden tube 45 preferably from about one quarter to one half of the wave length of the acoustic waves which make up the signal, and is connected with the loud-speaking receiver by a coupling 46, which, as shown, is inserted therein to make an airtight joint, although as hereinafter described, it may be slightly separated therefrom as shown in Fig. 12. There is generally more latitude in the choice of the length of the percussion chamber II<sup>a</sup> than in the case of the percussion chamber II of Fig. 1. In some cases I have made the length of said percussion chamber II<sup>a</sup> about three eighths of a complete wave length of the acoustic signal waves, but this length depends somewhat upon the nature of the joint between the transmitter 1 and tube 45, and, if such joint is not airtight, upon the separation of these elements.

After all other adjustments have been made I prefer to test the adjustment of the length of the percussion chamber by varying the separation thereof with respect to the transmitter 1 until the best signal-static ratio is noted in the signal-indicating device T. The internal diameter of the tube 45 is about one-third of its external diameter, and it is placed against a wooden disc 23' which closely fits the tube 47, and closes one end of the stationary-wave-separating chamber 10' the other end of which is closed by the disc 24' closely fitting the tube 48 which has telescopic connection with said tube 47. As shown the percussion chamber tube 45 is inserted into the tube 47, and the discs 23', 24' may be adjusted longitudinally of the tubes in which they are placed.

It will be obvious, however, that a single tube having adjustable closure-discs, may be used in place of the telescoping tubes 47, 48.

The closure disc 23' is provided with a central opening 49 having a diameter preferably smaller than that of the internal diameter of the tube 45. In one set of apparatus which I have used, the length of the tube 45 was 4.5", its internal diameter 1" and its external diameter 3", its separation from the transmitter 1 was .25", the width of the disc 23' was .5", its diameter was 3" and the central opening 49 thereof was .375".

The element V<sup>a</sup> is a stationary-wave-separating device formed in the present instance by the telescoping tubes 47, 48 and their slidable end closures. By adjusting the position of the closure disc 24' or by changing the relative position of one of the tubes with respect to the other, longitudinally, the stationary-wave-separating chamber 10' may be made to resonate to the acoustic signal waves which make up the signals to be received and to the periodic vibrations developed by the receiver 1 in the percussion chamber and stationary-wave-separating chamber when the receiving system is acted upon by static disturbances.

The curve K$n$ is the space-motion curve of the acoustic waves created by the signal impulses in the chamber 10', its corresponding space-pressure curve being shown at P$n$. The curve K$n'$ represents the space-motion curve of the acoustic waves developed in the chamber 10' by abrupt or impulsive electrical forces or static disturbances, and the curve P$n'$ is the corresponding space-pressure curve. In the present instance the length of the chamber 10' is 13.5", approximately. The fundamental thereof is 500 cycles per second, which is the frequency or pitch selected for the acoustic signal waves, and the frequency or pitch of the stationary wave developed therein by static disturbances is 1000 cycles per second or the first even harmonic or the octave thereof. It will be noted that this is just the reverse of the practice discussed above in connection with the embodiment of my invention shown in Fig. 1, where the pitch of the acoustic signal waves was chosen as a multiple of the periodic vibrations created in the reverberation chamber by static disturbances, which has the advantage that it is generally easier to embody static or shock-excited acoustic waves at the fundamental frequency of the stationary-wave chamber than at the octave or other harmonics thereof.

However, as indicated diagrammatically in Fig. 11<sup>a</sup>, it is preferable, generally, to select the fundamental of the chamber 10' as the frequency of the waves excited therein by the static disturbances and to use the octave thereof as the acoustic signal wave frequency. In the case where the chamber 10' is 13.5" in length, the frequency $n'$ of the shock-excited waves will be 500 and that of the acoustic signal waves 1000, the curve K$n'$ representing the space-motion curve of the standing acoustic waves formed in said chamber 10' by electrical disturbances, the curve P$n'$, the corresponding space-pressure curve, and the curves K$n$ and P$n$ representing the space-motion and space-pressure curves, respectively, of the standing acoustic signal wave formed in said chamber.

As more fully explained in connection with Fig. 12, the ratio of the desired to the undesired acoustic vibrations may be 3 to 2, in which case the frequency $n'$ of the shock-excited or undesired waves, represented by the curves K$n'$ and P$n'$, may be 1000, and that of the desired or signal waves, represented by the curves K$n$, P$n$, may be 1500.

It will be obvious that by proper adjustment of the apparatus, various other ratios of the frequencies of the two sets of vibrations may be secured.

The element IV^a which I call a counter-phase tube, is a coupling device for conveying the acoustic signal waves to apparatus whereby they are converted into signals and for eliminating or minimizing the effect of the shock-excited waves on said apparatus.

The counter-phase tube shown in Fig. 11 comprises a double series of tubular sound passages which enter the chamber 10′ and are brought together inside of another chamber which is connected acoustically with apparatus responsive to sound waves. Specifically, the tubes 50, 51, pass through holes 52, 53, respectively, in the tubes 47, 48, and are slidably connected with tubes 54, 55, respectively, which are curved to pass through holes in the opposite disc-walls of a cylindrical chamber 56 and to have slidable engagement with said walls. The holes 52, 53 are about one-half inch in diamter the tubes 50, 51, about .375″ in internal diameter and the chamber 56 is about 3″ long and 2″ in diameter, in one arrangement of the apparatus wherein the chamber 10′ is 13.5″ in length. Obviously however these dimensions may be widely varied without departing from the principle of my invention. The two sets of tubes 50, 54, and 51, 55, are duplicates and each constitutes an adjustable resonator. When the apparatus is properly adjusted, as hereinafter more fully set forth, periodic shock-excited impulses having opposite phases, such for example as the impulses, the pressure variation of which is shown by the curve P$n'$, will be picked up by the tubes 50, 51 at the openings 52, 53, respectively, and conveyed to the chamber 56 when the two sets of resonators are adjusted for the best response to the forced acoustic signal vibrations.

The shock-excited impulses that succeed in passing through the two sets of resonators 50, 54, and 51, 55, which are out of resonance with them will be reduced in the audio-frequency amplifier M which, as in the system shown in Fig. 1, is attuned to the acoustic signal waves. The forced acoustic signal vibrations are readily passed through said resonators, the chamber 56 and the adjustable resonator, consisting of the telescoping tubes 57, 58 about .5″ internal diameter, which enters the chamber 56 and the converting device 40, preferably an electromagnetic telephone transmitter. Obviously the undesired vibrations which have opposite phases at the cross sections of the chamber 10′ where the tubes 50, 51, enter the same, will interfere and produce practically no sound in the chamber 56.

It will be noted that the apparatus shown in Fig. 11 as well as that already described in connection with Fig. 1, constitutes a means for converting both sets of electrical vibrations, those created in the system by static disturbances as well as those developed therein by the signal waves, into dephased-spatialized non-electrical vibrations, which, in the present instance, are sonorous vibrations or sound waves, and means so associated therewith that the amplitude therein of the signal vibrations is large compared to the resultant amplitude of the undesired vibrations.

Manifestly any suitable apparatus may be employed in connection with the chamber 56 for converting the signal vibrations into readable signals. Preferably, however, I prefer to first reconvert them by means of the device 40 or otherwise into electrical vibrations and employ the latter for producing such signals by means of the audio-frequency amplifier M and the signal indicating device T already described in connection with Fig. 1, and which form element VII of the system is shown in Fig. 11.

In the modification shown diagrammatically in Figure 11^a, the space-pressure curve P$n'$ of the shock-excited vibrations has maxima at opposite phases at the ends of the chamber 10, and therefore at these points the resonator tubes 50, 51, enter said chamber so that the said vibrations passing through said resonator to the chamber 56 will produce a differential or nullifying effect thereon. However at said points the curve P$n$ representing the space-pressure variation of the signal waves has maxima in the same phase, so that said vibrations will exert a cumulative effect in the chamber 56. In the modification shown in Fig. 12, where the loud-speaking telephone 1 is separated by about .25″ from the percussion chamber 45, the tubes 50, 51, enter the chamber 10′ at points 52, 53, where the shock-excited acoustic waves have maxima in opposite phases and the signal wave, as in the case shown in Fig. 11, has a maximum at the point 52 and a zero value at the point 53, so that said signal wave will create vibrations in said chamber 56 and the resonator 57, 58, connected therewith.

As above stated the stationary-wave-separating chamber shown in Fig. 11 may consist of a single tube, in which case the pitch of the shock-excited vibrations is altered by changing the position of the disc 24′, and such vibrations caused to interfere and produce a differential effect in the chamber 56 by shifting the position of the intake hole 53, such hole being always in the middle of the chamber 10′, closed at its ends by the discs 23′, 24′, when the frequency of said vibrations is the first even harmonic or octave of the fundamental of said chamber. It will be understood of course that as the position of the disc 24′ is shifted, the length of the percussion tube 45 must be suitably changed, such length being determined by trial. I prefer however to form the stationary-wave-separating chamber of two telescoping tubes in the manner indicated, in which case the position of the intake 53 with respect to the tube 48 is not changed, the slidable connections between the pipes 54, 55, and the chamber 56, permitting the relative movement of the tubes 47 and 48, and the movement of the resonator tubes 51, 55 with respect to said chamber 56.

The slidable connections between each pair of tubes 51, 55, and 50, 54, will permit compensating adjustments in the periods of said resonator tubes to be made, if necessary, when the positions of the tubes 54, 55, with respect to the chamber 56, are changed.

In order to effect more readily the tuning of said resonator tubes and to compensate for changes in their length caused by the relative movement of the tubes 47, 48, I may employ the arrangement shown in Fig. 13. In this modification of my invention the percussion-chamber tube consists of two drilled dowels 59, 60, placed in one end of the tube 47 and arranged for relative longitudinal movement along the axis thereof for the purpose of changing the frequency of the shock-excited stationary waves developed in the chamber 10'. The curved tubes 54, 55 of the counter-phase tube, instead of entering the chamber 56, are provided with tubes 61, 62, respectively, having slidable engagement with their lower ends and with the side walls of the chamber 56. The correct separation between the proximate ends of said tubes 61, 62, as well as the tubes 54, 55, of Figs. 11 and 12, can be found only by actual trial and is usually about .0625".

The operation of the system shown in Figs. 11 to 13, inclusive, and the modes of adjusting the several elements thereof, are as follows:—

(1) The pitch of the vibrations produced by the loud-speaking telephone receiver 1 is adjusted by changing the capacity of the precision condenser $C^2$ of the heterodyne oscillator H until the response obtained at the opening 53 when a listening tube or recording acoustic device is placed therein, is a minimum in which case the local amplitude of the pressure-stationary-wave of frequency $n$ will be substantially zero.

(2) The pitch of said vibrations is again adjusted to give a maximum response when a listening tube or recording acoustic device is inserted either in the opening 53 or the opening 52, in which case a stationary wave having the octave $n'$ of the wave of frequency $n$ will have been developed in the chamber 10' and the pressure-curve $Pn'$ thereof will have dephased maxima at or near said openings. The length of the percussion-chamber tube 45 is then changed until a shock produced in said tube by the receiver 1 excites a vibration therein having the frequency $n'$, the octave of the chamber 10'.

(3) The length of the sliding tubes 50, 54, and 57, 58, is adjusted until a maximum acoustic response is obtained with the fundamental frequency $n$ of the chamber 10', produced therein by the receiver 1, when a tuned listening tube or suitable recording device is placed at the outer end of the tube 58 where the translating device 40 is situated. After the two sets of resonator tubes 50, 54, and 57, 58, have been attuned to the fundamental of the chamber 10', the resonator tubes 51, 55, are substituted for the resonator 50, 54, and with the resonator 57, 58, still in position, are attuned to said fundamental, the tube 51 being, of course, in the opening 52 instead of the tube 50.

(4) The resonator 51, 55, is now restored to its proper position, the tube 51 being in the opening 53, and the pitch of the vibrations produced by the telephone receiver 1 is again changed by adjustment of the condenser $C^2$ until the half-wave length thereof is equal to the distance between the openings 52 and 53, that is to say, until the standing wave developed in the chamber 10' is the octave, $n'$ thereof.

When the system has been adjusted in the manner above set forth, the acoustic vibrations developed in the chamber 10' by abrupt or impulsive electrical forces or static disturbances will interfere in the chamber 56 and produce substantially no effect on the translating device 40, while the signal beat-frequencies will develop in said chamber acoustic vibrations which will produce a maximum effect on said device.

It will be apparent that the frequency $n'$ of the shock-excited vibrations may be taken as the frequency produced by the receiver 1 when the receiving system is acted upon by the most pronounced interfering transmitting station, as hereinbefore more fully set forth in connection with Fig. 1.

In view of the foregoing explanation, the modes of adjusting the apparatus represented in Figs. 11ª, 12 and 13 will readily be understood by those skilled in the art.

In Fig. 14 I show an adaptation of the counter-phase tube to the system represented in Fig. 1, the reverberation chamber 9 being connected with the stationary-wave-separating chamber 10 by means of the resonant filter coupling 11, 12 of which the tube 11 is shown in the present instance as open-ended, although if desired it may be provided with the pick-up discs 19, 20 and radial holes 16, shown in Fig. 1. If the chamber 10 is 13.5" in length, the curves representing the space-motion and space-pressure stationary waves of the frequency $n$ of the signal beat-tone and the frequency $n'$ of the shock-excited vibrations will be substantially as indicated.

The openings 52, 53 will be at cross-sections of the tube where the space-pressure curve P$n'$ of the shock-excited vibrations has maxima opposite in sign and where the space-pressure curve P$n$ of the signal vibrations has maxima of the same sign. It follows therefore that the effect on the translating device 40 of the former will be differential and that of the latter will be cumulative.

This arrangement gives a better signal-static ratio in the translating device 40 and produces stronger audio-frequency currents in the amplifier M than those shown in Figs. 11 to 13, inclusive, but requires a somewhat greater reamplification in the audio-frequency amplifier in order to get signals of a given audibility in the signal indicating device T.

Another adaptation of the counter-phase tube to the system shown in Fig. 1 is represented in Fig. 15 in which the pick-up tube 63, provided with the usual discs and series of radial holes between the same, is inserted through the end wall 24 of the stationary-wave-separating chamber 10 and is connected at its outer end to a flexible tube 65 coupled to a short tube 66 which enters one of the walls of the mixing chamber 56. Passing through said disc 24 near the periphery thereof is a relatively short tube 67 coupled to a flexible tube 68 which is connected to a tube 69 entering the other wall of the chamber 56 and having its inner end arranged opposite and in close proximity to the inner end of the tube 66. The tube 67 which preferably is parallel to the axis of the chamber 10 is fixed relatively to the disc 24 and the pick-up tube 63 is arranged for longitudinal movement with respect to said disc.

The method of using the system shown in Fig. 15 is the same as already set forth in connection with Figs. 11 to 14, inclusive. The distance between the openings 69' and 70 are adjusted until the note produced by the electrical disturbances is a minimum and that of the signal beat-tone a maximum. The tubular members 65, 68 are so chosen that the total air columns in the tubes 63, 65, 66 and the tubes 68, 69, 70 are each in resonance with the desired note. For convenience in adjustment, each said tubular member may be split into two or more sliding members as indicated at 71, 72.

In Fig. 16 I show a further modification of the system represented in Fig. 11 wherein the percussion chamber 73 is open-ended and is arranged in close proximity to the mouth 46 of the loud-speaking telephone receiver 1, this arrangement permitting a considerable amount of the energy of the irregular acoustic disturbances produced by said receiver when the receiving system is acted upon by electrical disturbances to escape into the air and in this manner it reduces the amplitude of the shock-excited periodic vibrations developed in the chamber 10'. In the present instance the frequency of the signal vibrations is taken as 1365 and that of the shock-excited vibrations as 910, the two sets of vibrations being in the ratio of 3 to 2. The length of the chamber 10' therefore will be approximately 14.5" and the seperation of the openings 69', 70 will of course be equal to a half wave length of the shock-excited vibrations or 7.25". Preferably the length of the percussion chamber is equal to a quarter wave length of the shock-excited vibrations or 3.625". The pick-up tube 63 and the tube 67 which are substantially the same as those already described in connection with Fig. 15 are connected in any suitable manner, as by the flexible tubes 74, 75 and the tubes 66, 69, with the mixing chamber 56. The curves shown in Fig. 16 represent the variation with space of the pressure and motion of the two sets of acoustic vibrations, as in the case of preceding figures, except that the quarter wave length of the space-motion curve K$n'$ of the shock-excited vibrations in the percussion chamber is indicated.

It will be understood that in this instance as in the case of all other embodiments of my invention, the dimensions and values given herein are merely illustrative and are only approximate, the final adjustment in all cases being made by trial.

In Fig. 17 I have shown a further modification of the system illustrated in Fig. 11 wherein an open-ended tube 76 is slidably connected with the tube 47 and forms with the outer end of the latter a combined percussion and reverberation chamber. The mouth of the receiver 1 is placed a short distance away from the open end of the tube 76, say, for example, .25", so as to allow a large part of the acoustic shock to dissipate itself before reaching the stationary-wave-separating chamber 10'. The openings 52, 53 are placed as shown at the ends of the chamber 10' so as to transmit, with the same phase, vibrations the frequency of which is the octave of said chamber and to transmit in opposite phases shock-excited vibrations the frequency of which is the fundamental of said chamber, the latter being caused to interfere and nullify each other in the mixing chamber 56. In the case represented in Fig. 17 where the chamber 10' is 13.5" in length, this being the half wave length of the shock-excited vibrations of frequency $n'$, the combined percussion and reverberation chamber is 6.75" long, and the quarter wave length of the space-motion curve K$n'$ is indicated therein. The length of the said combined percussion-reverberation chamber is adjusted by sliding the tube 76 over the tube 47 and by varying the distance between the receiver 1 and the end of the tube 76 until there is obtained the sharpest and clearest variation in the amplitude of the shock-excited vibrations produced when the circuit of the receiver is suddenly opened or closed, as the approximate artificial equivalent of "click" static.

The action of the counter-phase tube is improved by constricting the branch which is nearer the in-put of the stationary-wave-separating chamber, so that the greater sound amplitude developed therein as compared with that of the other branch thereof, can be more perfectly neutralized in the chamber 56. This is indicated in Fig. 17 by representing the tube 50' as smaller in diameter than the tube 51, but obviously the same effect can be produced by making the tube 50 of Fig. 11 out of flexible material and using an adjustable clamp for constricting the same, or the tube 54 of Fig. 11 or the tube 61 of Fig. 13 may be partially stopped to reduce the amplitude of the sound therein to that of the sound in the corresponding tube of the other branch.

The method of adjusting the apparatus shown in Fig. 17 is as follows:

By varying the precision condenser $C^2$ the chamber 10' as modified by the association therewith of the tube 76 is attuned to a given fundamental, say for example, 500 cycles per second which will be the pitch of the vibrations developed therein by electrical disturbances, and to the octave thereof, 1000 cycles per second, which will be the frequency of the signal beat-tone, and the various resonator tubes are attuned to the latter in the manner set forth in connection with Fig. 11. The separation of the receiver 1 and the tube 76 improves the signal-static ratio because of the dissipation of a portion of the energy of the irregular noises produced by the receiver when the receiving system is excited by electrical disturbances.

It will be noted that, as above pointed out in connection with the other embodiments of my invention, the fundamental of the chamber 10' in Fig. 17 may be adjusted to be coincident with the signal beat-frequency of an interfering transmitting station.

In the foregoing specific description of certain forms of apparatus in which my invention may be embodied, and in some of which it has been worked out in practice, it has been assumed that the several chambers have tubular walls parallel to the cylindrical axis; but it is obvious that chambers of other shapes may be employed without departing from the principles upon which my invention is based.

Various means may be employed for exaggerating or accentuating the effect of the stationary waves at cross sections of the several chambers where the energy thereof is potential, and one method of accomplishing this result is illustrated in Fig. 18 where the cross section of the chambers at such points is constricted to less than one per cent of its normal area, such constriction beginning at points about one fourth of a wave length away from the maximum points of the space-pressure curves. The stationary-wave-separating chamber 10'' shown in Fig. 18 consists of three sliding tubes 77, 78, 79, a tube 80 sliding over the tube 79 and having disc closures 81, 82 for forming a reverberation chamber. In the tubes which make up the stationary-wave-separating chamber are three wooden dowels 83, 84, 85 with funnel-shaped centers, said dowels being arranged for longitudinal adjustment with respect to the tubes in which they are placed, and the dowel 84 having two oppositely disposed funnels. The area of the most constricted portion of said funnels is about one per cent of the cross section of the chamber 10''. As indicated the resonator tubes 50, 51 of the counter-phase tube enter the dowels 83, 84 and the openings 52, 53 thereof connect with the constricted portions of said funnels. The effect of this arrangement is to increase the potential or pressure energy at the cross sections of the chamber 10'' where a coupling device, such as the counter-phase tube, enters therein. The apparatus shown in Fig. 18 is preferred where the frequency of the signal waves is the fundamental of the stationary-wave-separating chamber and that of the shock vibrations is the octave thereof.

It has been assumed in the preceding description that the stationary-wave-separating chamber 10 of the system shown in Fig. 1 was always resonant to at least two frequencies, viz, the frequency excited indirectly therein by an acoustic shock and the frequency of the signal beat-tones forced therein by the receiver 1, but such mode of attuning said chamber is not always essential, as shown in Fig. 19, when the counter-phase tube is employed. In the particular case the chamber 10 is 20.25'' in length which is 3/4 wave length for vibrations having a frequency of 500 and 3/2 wave lengths for those of frequency 1000. The chamber 10 being therefore 1.5 wave lengths long for vibrations of the signal frequency, stationary acoustic waves will be developed therein, the curve $Kn$ representing the space-motion variation and the curve $Pn$ the space-pressure variation thereof; but obviously shock-excited waves having a frequency of 500 cycles per second, the fundamental of the reverberation chamber 9, connected as shown in Fig. 1 with said chamber 10 by the resonant filter-coupling 11, 12, cannot form stationary waves in said chamber because a stationary wave in a closed tube must end with a motion node. This arrangement obviously has the advantage of reducing the amplitude of the shock-excited vibrations transmitted through the counter-phase tube to the translating device 40.

In Fig. 20 a tube 86 having two branches 87, 88 each including a tube 89, 90 or other suitable means for adjusting the period thereof, connects the percussion chamber 45 with the ends of an open-ended stationary-wave-separating chamber 10''', the latter being provided with discs 91, 92, arranged for longitudinal adjustment therein. The curves $Pn$ and $Pn'$ represent the space-pressure variation of the signal beat-tones and the shock-excited vibrations, respectively, the frequency of the latter being half that of the former in this particular instance. Associated with the chamber 10''' which preferably consists of two sliding tubes 93, 94, is a counter-phase tube such as heretofore described, and in the present instance the resonator tubes 50, 51 enter the chamber 10''' at points just inside the ends of the stationary-wave-separating chamber 10''' formed by the closure discs 91 and 92.

The dotted line $Pn$ in Fig. 20 shows a stationary-pressure wave due to a signal of 1000 cycles. The dotted line $Pn'$ in Fig. 20 shows the stationary-pressure wave due to the shock-excited acoustic vibration of 500 cycles. It should be noted that when a single open cylinder, such as 93 or 94, is excited acoustically near its open end, all stationary waves of whatever frequency have a pressure loop at its closed end, such as 92 or 91. The fact that the forced frequency indicated in Fig. 20 is giving a stationary half wave length in 93 or 94 and a stationary quarter wave length therein for the shock-excited frequency,—results in a normal distribution of pressure in the curve $Pn$ and an irregular distribution thereof in the curve $Pn'$ with a pressure node at the opening as shown by actual measurements on commercial apparatus, and indicated in Fig. 20. There is a loop of pressure at the partition 92 and a node one-quarter wave length out from said partition for said signal frequency, the remainder of the distribution being irregular.

It is evident that the stationary waves show signal pressure maxima of the same phase and shock-excited pressure maxima of opposite phases at the points 52 and 53 just inside the stationary wave separating chamber 10'''.

In Fig. 21 the said tuned branch tube 87, 88 connects the percussion chamber with the ends of a closed stationary-wave-separating chamber $10^{iv}$ consisting as shown of the sliding tubes 95, 96. The curves $Pn$ and $Pn'$ represent the space-pressure variation of the signal beat-tones and the shock-excited vibrations, respectively, the frequency of the former being double that of the latter. A counter-phase tube is connected with the chamber $10^{iv}$ at points where the ordinates of the curve $Pn$ are maxima of the same sign and where the curve $Pn'$ crosses the zero axis, and therefore the effect of the shock-excited vibrations on the translating device 40 will be a minimum while that of the signal beat-tones will be a maximum.

In Fig. 22 the closed acoustic spatializer or stationary-wave separating chamber $10^v$ is a toroidal tube made up in the present instance of six sections, of which the sections 97, 97', 97'' are fixed and the sections 98, 98' and 98'' are arranged to slide with respect to the adjacent fixed sections, respectively. One end of the flexible tube 99 is connected with the percussion chamber 45 by a sliding tube 100 so that the period of the tube 99 with its attached tube 100 may be attuned to a predetermined frequency, and the other end thereof is connected with a sound chamber 101 having three outlets connected respectively with the tubular sections 98, 98', 98'' by means of the flexible tubes 102, 102', 102''.

Two of the fixed tubular sections are provided with slots 103, 103' adapted to receive the ends of the branches 104, 104' of a counterphase tube, the end of each said tube passing through a hole 105, 105' in a metallic cover 106, 106' arranged over the sections 97', 97'', respectively, the sides of each of said slides extending below the horizontal diameter of the tubular sections, as shown in Fig. 23, so that they will be retained thereon. The sliding tubular sections 98, 98', 98'' are so adjusted that the ends of the flexible tubes 102, 102', 102'' enter the stationary-wave-separating chamber one hundred and twenty geometric degrees apart, and therefore shock-excited stationary waves developed in said system will tend to destroy each other for the reason that the rector sum of three sinusoidal waves dephased one hundred and twenty degrees in space is everywhere zero. By suitably adjusting the points where the ends of the counter-phase tubes enter the stationary-wave-separating chamber by means of the sliding cover 106, 106', the effect of the signal beat-frequency on the translating device 40 will be a maximum. The arrangement of the three intake tubes and sectionalized tubular toroid shown in Fig. 22 may be replaced by $n$ fixed and $n$ movable sections, using $n$ intake leads spaced $\frac{360}{n}$ geometrical degrees apart; since the sum of $n$ stationary waves having the fundamental frequency of the above tubular toroid spaced $\frac{360}{n}$ geometrical degrees is zero throughout said toroid.

Each of the systems herein particularly described for the purpose of more fully disclosing my invention involves the application of my discovery that the vibrations created in a receiving system by abrupt or impulsive electrical forces may be converted in a suitable instrumentality into spatialized-non-electrical vibrations, such as acoustic vibrations produced in a column of air, and that by spatializing in the same instrumentality, the acoustic vibrations which make up the signal to be received, the two sets of vibrations can be segregated.

The best apparatus known to me at the present time for effecting such spatialization and segregation of the two sets of acoustic vibrations is a tubular chamber enclosing a column of air, but it is to be understood that I do not limit my invention to the use of the same.

It will be obvious that the principle underlying my invention can be embodied in numerous forms of apparatus and circuit arrangements and therefore it is to be understood that my invention, as defined by the appended claims, is not to be limited to the particular forms of apparatus and circuit arrangements herein specifically described.

I claim:—

1. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized non-electrical vibrations, apparatus so associated with said means that the amplitude therein of the non-electrical vibrations resulting from the waves the energy of which is to be received is large compared to the amplitude therein of the non-electrical vibrations resulting from the abrupt or impulsive electrical forces, and a signal indicating device associated with said apparatus.

2. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized sonorous vibrations, apparatus so acoustically associated with said means that the amplitude therein of the sonorous vibrations resulting from the waves the energy of which is to be received is large compared to the amplitude therein of the sonorous vibrations resulting from the abrupt or impulsive electrical forces, and a signal indicating device associated with said apparatus.

3. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized non-electrical vibrations, apparatus associated with said means at a point where the amplitude of the non-electrical vibrations resulting from the waves the energy of which is to be received is substantially larger than the amplitude of the non-electrical vibrations resulting from the abrupt or impulsive electrical forces, and a signal indicating device associated with said apparatus.

4. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized non-electrical vibrations, apparatus associated with said means at a point where the amplitude of the non-electrical vibrations resulting from the waves the energy of which is to be received is relatively large and the amplitude of the non-electrical vibrations resulting from the abrupt or impulsive electrical forces is practically zero, and a signal indicating device associated with said apparatus.

5. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized non-electrical vibrations, apparatus associated with said means at points where the resultant amplitude of the non-electrical vibrations resulting from the waves the energy of which is to be received is substantially larger than the resultant amplitude of the non-electrical vibrations resulting from the abrupt or impulsive electrical forces, and a signal indicating device associated with said apparatus.

6. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized non-electrical vibrations, apparatus associated with said means at points where the resultant amplitude of the non-electrical vibrations resulting from the waves the energy of which is to be received is relatively large and the resultant amplitude of the non-electrical vibrations resulting from the abrupt or impulsive electrical forces is practically zero, and a signal-indicating device associated with said apparatus.

7. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized non-electrical vibrations, apparatus associated with said means at points where the amplitudes of the non-electrical vibrations resulting from the waves the energy of which is to be received are cumulative and the amplitudes of the non-electrical vibrations resulting from said abrupt or impulsive electrical forces are differential, and a signal indicating device associated with said apparatus.

8. An electromagnetic-wave receiving system comprising in combination means for converting the electrical vibrations developed in said system by abrupt or impulsive electrical forces and the electrical vibrations developed therein by the electromagnetic waves the energy of which is to be received into dephased spatialized sonorous vibrations, apparatus acoustically associated with said means at a point where the amplitude of the sonorous vibrations resulting from the waves the energy of which is to be received is substantially larger than the amplitude of the sonorous vibrations resulting from the abrupt or impulsive electrical forces and a signal indicating device associated with said apparatus.

9. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized sonorous vibrations, apparatus acoustically associated with said means at a point where the amplitude of the sonorous vibrations resulting from the waves the energy of which is to be received is relatively large and the amplitude of the sonorous vibrations resulting from the abrupt or impulsive electrical forces is practically zero, and a signal indicating device associated with said apparatus.

10. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized sonorous vibrations, apparatus acoustically associated with said means at points where the resultant amplitude of the sonorous vibrations resulting from the waves the energy of which is to be received is substantially larger than the resultant amplitude of the sonorous vibrations resulting from the abrupt or impulsive electrical forces, and a signal indicating device associated with said apparatus.

11. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized sonorous vibrations, apparatus acoustically associated with said means at points where the resultant amplitude of the sonorous vibrations resulting from the waves the energy of which is to be received is relatively large and the resultant amplitude of the sonorous vibrations resulting from the abrupt or impulsive electrical forces is practically zero, and a signal indicating device associated with said apparatus.

12. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized sonorous vibrations, apparatus acoustically associated with said means at points where the amplitudes of the sonorous vibrations resulting from the waves the energy of which is to be received are cumulative and the amplitudes of the sonorous vibrations resulting from said abrupt or impulsive electrical forces are differential, and a signal indicating device associated with said apparatus.

13. An electromagnetic-wave receiving-system comprising in combination means for converting abrupt or impulsive electrical forces into spatialized periodic non-electrical vibrations of predetermined frequency, a signal indicating device, and means associating said signal indicating device with said means.

14. An electromagnetic-wave receiving-system comprising in combination means for converting abrupt or impulsive electrical forces into spatialized periodic acoustic vibrations of predetermined frequency, a signal indicating device, and means acoustically associating said signal indicating device with said means.

15. An electromagnetic-wave receiving-system comprising in combination means for converting abrupt or impulsive electrical forces into spatialized periodic non-electrical vibrations of predetermined frequency, a signal indicating device, and means so associating said signal indicating device with said means that the effect on said signal indicating device of the non-electrical vibrations to be received is relatively large and the effect on said signal indicating device of the non-electrical vibrations resulting from said abrupt or impulsive electrical forces is relatively small.

16. An electromagnetic-wave receiving-system comprising in combination means for converting abrupt or impulsive electrical forces into spatialized periodic acoustic vibrations of predetermined frequency, a signal indicating device, and means so acoustically associating said signal indicating device with said means that the effect on said signal indicating device of the acoustic vibrations to be received is relatively large, and the effect on said signal indicating device of the acoustic vibrations resulting from said abrupt or impulsive electrical forces is relatively small.

17. An electromagnetic-wave receiving-system comprising in combination means for converting abrupt or impulsive electrical forces into spatialized periodic non-electrical vibrations of predetermined frequency, a signal indicating device, and means so associating said signal indicating device with said means that the effect on said signal indicating device of the non-electrical vibrations to be received is relatively large and the effect on said signal indicating device of the non-electrical vibrations resulting from said abrupt or impulsive electrical forces is substantially zero.

18. An electromagnetic-wave receiving-system comprising in combination means for converting abrupt or impulsive electrical forces into spatialized periodic acoustic vibrations of predetermined frequency, a signal indicating device, and means so acoustically associating said signal indicating device with said means that the effect on said signal indicating device of the acoustic vibrations to be received is relatively large and the effect on said signal indicating device of the acoustic vibrations resulting from said abrupt or impulsive electrical forces is substantially zero.

19. An electromagnetic-wave receiving-system comprising in combination means for converting abrupt or impulsive electrical forces into spatialized periodic acoustic vibrations of predetermined frequency, an acoustic resonator resonant to the frequency of said acoustic vibrations and to the frequency of the acoustic vibrations to be received, a coupling member acoustically connecting said means with said acoustic resonator, said coupling member being resonant to the frequency of the acoustic vibrations to be received, and a signal indicating device associated with said acoustic resonator.

20. An electromagnetic-wave receiving-system comprising in combination an acoustic resonator having a partition located intermediate its ends at the cross section thereof where a stationary acoustic wave having the frequency of the fundamental of said resonator has a pressure node.

21. An electromagnetic-wave receiving-system comprising in combination an acoustic resonator having a partition located intermediate its ends at the cross section thereof where a stationary acoustic wave having the frequency of the fundamental of said resonator has a pressure node, said partition being provided with perforations filled with porous sound-absorbing material.

22. An electromagnetic-wave receiving-system comprising in combination means for converting abrupt or impulsive electrical forces into spatialized periodic acoustic vibrations of predetermined frequency, a resonant wave-separating chamber attuned to the frequency of the acoustic vibrations to be received, a tubular telescoping coupling device acoustically connecting said means and said chamber, said device having an opening near each end thereof, and a pair of discs arranged for longitudinal relative movement along said member, the members of each said pair of discs being located on either side of one of said openings.

23. An electromagnetic-wave receiving-system comprising in combination a percussion chamber, a telephone receiver electrically associated with said system and acoustically associated with said chamber, a reverberation chamber acoustically associated with said percussion chamber, a stationary-wave-separating chamber acoustically associated with said reverberation chamber and a signal indicating device associated with said stationary-wave-separating chamber.

24. An electromagnetic-wave receiving-system comprising in combination means for converting abrupt or impulsive electrical forces and the electromagnetic waves the energy of which is to be received into dephased spatialized sonorous vibrations, a reflection chamber, means acoustically coupling the first mentioned means with said reflection chamber and apparatus for converting sonorous vibrations into electrical vibrations, said apparatus being placed with its driven member at or near one of the foci of said reflection chamber.

25. An electromagnetic-wave receiving-system comprising in combination a reflection-absorption chamber having longitudinally movable members located at the ends of its major axis, the juxtaposed surfaces of said members having the same curvature as the interior of said chamber.

26. An electromagnetic-wave receiving-system comprising in combination a reflection-absorption chamber consisting of two separable sections, each said section having such curvature that sonorous vibrations entering the said chamber at or near one focal point will be directed to the other focal point.

27. An electromagnetic-wave receiving-system comprising in combination a reflection-absorption chamber comprising two separable members, the interior surface of each of which is approximately ellipsoidal.

28. An electromagnetic-wave receiving-system comprising in combination a reflection-absorption chamber consisting of two separable sections, each said section having such curvature that sonorous vibrations entering the said chamber at or near one focal point will be directed to the other focal point, and a partition of sound-absorbing material located intermediate the ends of said chamber at a point where a stationary wave developed therein and having the frequency of the fundamental thereof has a node of pressure.

29. An electromagnetic-wave receiving-system comprising in combination means for converting abrupt or impulsive electrical forces into spatialized periodic acoustic vibrations of predetermined frequency, said means having its fundamental different from that of the acoustic vibrations developed therein by the signal waves, a stationary-wave-separating chamber resonant to the acoustic vibrations resulting from the abrupt or impulsive electrical forces and to the acoustic vibrations of the signal waves, a coupling device acoustically connecting said means and said stationary-wave-separating chamber, said coupling device being relatively movable with respect to said means and to said stationary-wave-separating chamber, and a signal indicating device associated with said stationary-wave-separating chamber.

30. An electromagnetic-wave receiving-system comprising in combination an acoustically tunable chamber, means whereby the energy of abrupt or impulsive electrical forces is caused to shock said chamber into spatialized acoustic vibrations, said chamber being resonant to a predetermined frequency and also to the frequency of the acoustic vibrations created therein by the electromagnetic signal waves, the frequency of said acoustic vibrations developed in said chamber by the electromagnetic signal waves being different from that of the acoustic vibrations developed therein by the abrupt or impulsive electrical forces, and means for conducting from said chamber the energy of the acoustic vibrations created therein by said signal waves, said means being relatively movable with respect to said chamber and attuned to the frequency of said acoustic signal vibrations.

31. An electromagnetic-wave receiving-system comprising in combination means for creating dephased spatialized sonorous vibrations, an acoustic coupling device consisting of two tubes, the inner ends of which have telescopic connection and the outer end of each of which is provided with a perforation, and a pair of longitudinally movable discs arranged on the outer end of each said tube, one on either side of each said perforation.

32. An electromagnetic-wave receiving-system comprising in combination a telephone receiver, a percussion chamber in proximity thereto, a reverberation chamber acoustically connected to said percussion chamber, a stationary-wave-separating chamber, an acoustic coupling device connecting said reverberation chamber with said stationary-wave-separating chamber, a reflection chamber, an acoustic coupling device connecting said stationary-wave-separating chamber and said reflection chamber, said reverberation chamber, stationary-wave-separating chamber and reflection chamber and said acoustic coupling devices each being attuned acoustically to the frequency of the acoustic vibrations produced by said telephone receiver when said system is acted upon by the electromagnetic signal waves the energy of which is to be received, an electromagnetic telephone transmitter operatively associated with said reflection chamber, and a signal indicating device electrically connected with said electromagnetic telephone transmitter.

33. The combination, with an electromagnetic-wave receiving-system having a radio-frequency amplifier connected with an oscillation detector, an audio-frequency amplifier connected with said oscillation detector and a telephone receiver connected with said audio-frequency amplifier, of a percussion chamber arranged to be energized acoustically by said telephone receiver, a reverberation chamber acoustically connected with said percussion chamber, a stationary-wave-separating chamber acoustically connected with said reverberation chamber, a reflection chamber acoustically connected with said stationary-wave-separating chamber, an electromagnetic telephone transmitter arranged at or near one of the foci of said reflection chamber, an audio-frequency amplifier electrically connected with said electromagnetic telephone transmitter and a signal indicating device operatively associated with the last mentioned audio-frequency amplifier.

34. An electromagnetic-wave receiving-system comprising in combination means including a telephone receiver for converting abrupt or impulsive electrical forces into spatialized periodic acoustic vibrations of predetermined frequency, a stationary-wave-separating chamber acoustically connected to said means, the octave of said stationary-wave-separating chamber being equal to the fundamental of said means, and the fundamental of said means being different from the frequency of the acoustic vibrations developed by said telephone receiver when said system is acted upon by the electromagnetic signal waves the energy of which is to be received.

35. An electromagnetic-wave receiving-system comprising in combination means for converting abrupt or impulsive electrical forces into spatialized acoustic vibrations, and a reflection chamber having such curvature that sonorous vibrations entering therein at or near one of its focal points will be directed to the other focal point, the length of said chamber being approximately that of a complete acoustic wave having the frequency of the acoustic waves produced when electromagnetic signal waves the energy of which is to be received acts upon said system.

36. An electromagnetic-wave receiving-system comprising in combination a reflection-absorption chamber having longitudinally movable members located at the ends of its major axis, the inner surfaces of said members having the same curvature as the interior of said chamber, an acoustic coupling member passing through an opening in the center of one of said longitudinally movable members, a device for converting acoustic vibrations into electrical vibrations, and a support for said device, said support passing through an opening in the center of the other of said longitudinally movable members.

37. An electromagnetic-wave receiving-system comprising in combination a reflection-absorption chamber consisting of two separable sections, each section having such curvature that acoustic vibrations entering said chamber at or near one focal point will be directed to the other focal point, an acoustic coupling member passing through one of said sections and having its inner end at or near one of said focal points, a device for converting acoustic vibrations into electrical vibrations located at or near the other focal point of said chamber, and a support for said device, said support passing through the other of said sections.

38. An electromagnetic-wave receiving-system comprising in combination means for converting abrupt or impulsive electrical forces into spatialized periodic acoustic vibrations of predetermined frequency, a stationary-wave-separating chamber, a chamber intermediate said means and said stationary-wave-separating chamber and acoustically connected thereto, the last mentioned chamber having such curvature that acoustic vibrations entering therein at or near one focal point will be directed to the other focal point.

39. An electromagnetic-wave receiving-system comprising in combination means for converting abrupt or impulsive electrical forces into spatialized periodic acoustic vibrations of predetermined frequency, said means consisting of a chamber having such curvature that acoustic vibrations entering therein at or near one focal point will be directed to the other focal point, a stationary-wave-separating chamber, a coupling device acoustically connecting said means and said stationary-wave-separating chamber, and a signal indicating device associated with said stationary-wave-separating chamber.

40. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized sonorous vibrations, a counterphase tube comprising two branches acoustically associated with said means at points where the resultant amplitude of the sonorous vibrations resulting from the waves the energy of which is to be received is substantially larger than the resultant amplitude of the sonorous vibrations resulting from the abrupt or impulsive electrical forces, a chamber receiving the outer ends of said branches, and a signal indicating device associated with said chamber.

41. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized sonorous vibrations, a counterphase tube comprising two branches acoustically associated with said means at points where the resultant amplitude of the sonorous vibrations resulting from the waves the energy of which is to be received is relatively large and the resultant amplitude of the sonorous vibrations resulting from the abrupt or impulsive electrical forces is practically zero, a chamber receiving the outer ends of said branches, and a signal indicating device associated with said chamber.

42. An electromagnetic-wave receiving-system comprising in combination means for converting the electrical vibrations developed in said system by abrupt or impulsive electrical forces and the electrical vibrations developed therein by the electromagnetic waves the energy of which is to be received into dephased spatialized sonorous vibrations, a counterphase tube comprising two branches acoustically associated with said means at points where the amplitudes of the sonorous vibrations resulting from the waves the energy of which is to be received are cumulative and the amplitudes of the sonorous vibrations resulting from said abrupt or impulsive electrical forces are differential, a chamber receiving the outer ends of said branches, and a signal indicating device associated with said chamber.

43. An electromagnetic-wave receiving-system comprising in combination an acoustically tunable chamber, means actuated by the electrical vibrations developed in said system by abrupt or impulsive electrical forces and the electrical vibrations developed therein by the electromagnetic waves the energy of which is to be received for creating acoustic vibrations in said chamber, a counterphase tube comprising two branches entering said chamber at two points a quarter wave length of the fundamental of said chamber apart, each branch of said counterphase tube being attuned to the octave of said chamber, a chamber receiving the outer ends of said branches and a signal indicating device associated with the last mentioned chamber.

44. An electromagnetic-wave receiving-system comprising in combination an acoustically tunable chamber, means actuated by the electrical vibrations developed in said system by abrupt or impulsive electrical forces and the electrical vibrations developed therein by the electromagnetic waves the energy of which is to be received for creating acoustic vibrations in said chamber, a counterphase tube comprising two branches entering said chamber at two points a quarter wave length of the fundamental of said chamber apart, each branch of said counterphase tube being attuned to the octave of said chamber, a chamber receiving the outer ends of said branches, an adjustable resonator attuned to the octave of the last mentioned chamber, and a signal indicating device associated with said adjustable resonator.

45. An electromagnetic-wave receiving-system comprising in combination an acoustically tunable chamber, means actuated by the electrical vibrations developed in said system by abrupt or impulsive electrical forces and the electrical vibrations developed therein by the electromagnetic waves the energy of which is to be received for creating acoustic vibrations in said chamber, a counterphase tube comprising two branches entering said chamber at two points a half wave length of the fundamental of said chamber apart, each branch of said counterphase tube being attuned to the octave of said chamber, a chamber receiving the outer ends of said branches and a signal indicating device associated with the last mentioned chamber.

46. An electromagnetic-wave receiving-system comprising in combination an acoustically tunable stationary-wave-separating chamber, a percussion chamber in juxtaposition thereto, means for converting electrical vibrations into acoustic vibrations, said means being separated from said percussion chamber and relatively movable with respect thereto, a counterphase tube comprising two branches acoustically associated with said stationary-wave-separating chamber, a chamber receiving the outer ends of said branches and a signal indicating device associated with the last mentioned chamber.

47. An electromagnetic-wave receiving-system comprising in combination an acoustically tunable stationary-wave-separating chamber, a percussion chamber consisting of two relatively movable tubular sections, one section being in juxtaposition to said stationary-wave-separating chamber, a device for converting electrical vibrations into acoustic vibrations, said device being acoustically associated with the other of said sections, a counterphase tube comprising two branches acoustically associated with said stationary-wave-separating chamber, a chamber receiving the outer ends of said branches and a signal indicating device associated with the last mentioned chamber.

48. An electromagnetic-wave receiving-system comprising in combination a stationary-wave-separating chamber, a counterphase tube comprising two branches acoustically associated with said chamber and each terminating in the tube slidably connected therewith, a chamber receiving said tubes, each of said tubes being slidably connected with said chamber, and a signal indicating device associated with the last mentioned chamber.

49. An electromagnetic-wave receiving-system comprising in combination a reverberation chamber adapted to convert electrical vibrations into stationary acoustic waves, a stationary-wave-separating chamber, an acoustic coupling device connecting said reverberation chamber with said stationary-wave-separating chamber, a counterphase tube comprising two branches acoustically associated with said stationary-wave-separating chamber, a chamber receiving the outer ends of said branches and a signal indicating device associated with the last mentioned chamber.

50. An electromagnetic-wave receiving-system comprising a stationary-wave-separating chamber, a counterphase tube comprising two branches, one of said branches being slidably connected to said chamber along the central longitudinal axis thereof, a chamber receiving the ends of said branches and a signal indicating device associated with the last mentioned chamber.

51. An electromagnetic-wave receiving-system comprising in combination a stationary-wave-separating chamber, an adjustable open-ended percussion chamber in juxtaposition thereto, means for converting electrical vibrations into acoustic vibrations acoustically associated with and physically separated therefrom, a counterphase tube having two branches acoustically associated with said stationary-wave-separating chamber, a chamber receiving the outer ends of said branches and a signal indicating device associated with the last mentioned chamber.

52. An electromagnetic-wave receiving-system comprising in combination a stationary-wave-separating chamber having its cross sectional area at points where the stationary acoustic waves developed therein have pressure maxima much smaller than the other points.

53. An electromagnetic-wave receiving-system comprising in combination a stationary-wave-separating chamber the length of which is a multiple of a half wave length of the acoustic signal waves developed therein and of such length that the acoustic waves resulting from abrupt or impulsive electrical forces cannot form stationary waves therein.

54. An electromagnetic-wave receiving-system comprising in combination a stationary-wave-separating chamber open at both ends, means acoustically exciting the same at both ends, a counterphase tube comprising two branches acoustically associated with said chamber at points where the resultant amplitude of the acoustic signal waves is larger than the resultant amplitude of the acoustic waves produced by electrical disturbances, a chamber receiving the outer ends of said branches and a signal indicating device associated with the last mentioned chamber.

55. An electromagnetic-wave receiving-system comprising in combination a stationary-wave-separating chamber closed at both ends, means acoustically exciting the same at both ends, a counterphase tube comprising two branches acoustically associated with said chamber at points where the resultant amplitude of the acoustic signal waves is larger than the resultant amplitude of the acoustic waves produced by electrical disturbances, a chamber receiving the outer ends of said branches and a signal indicating device associated with the last mentioned chamber.

56. An electromagnetic-wave receiving-system comprising in combination a sectional toroidal stationary-wave-separating chamber, means acoustically exciting the same at points one hundred and twenty geometrical degrees apart, a counterphase tube acoustically associated with said chamber at points where the resultant amplitude of the acoustic signal vibrations is larger than the resultant amplitude of the acoustic vibrations resulting from electrical disturbances, and a signal indicating device associated with said counterphase tube.

In testimony whereof, I have hereunto subscribed my name this 31" day of October, 1921.

OSCAR C. ROOS.